United States Patent
Emura

(10) Patent No.: US 10,604,211 B2
(45) Date of Patent: Mar. 31, 2020

(54) BICYCLE REAR SPROCKET AND BICYCLE REAR SPROCKET ASSEMBLY

(71) Applicant: SHIMANO INC., Sakai (JP)

(72) Inventor: Atsuhiro Emura, Sakai (JP)

(73) Assignee: SHIMANO INC., Sakai (JP)

( * ) Notice: Subject to any disclaimer, the term of this patent is extended or adjusted under 35 U.S.C. 154(b) by 305 days.

(21) Appl. No.: 15/705,422

(22) Filed: Sep. 15, 2017

(65) Prior Publication Data

US 2019/0084646 A1    Mar. 21, 2019

(51) Int. Cl.
| | |
|---|---|
| *B62M 9/12* | (2006.01) |
| *F16H 55/08* | (2006.01) |
| *F16H 55/30* | (2006.01) |
| *F16H 57/00* | (2012.01) |
| *F16H 9/24* | (2006.01) |
| *B62M 9/10* | (2006.01) |

(52) U.S. Cl.
CPC ............... *B62M 9/12* (2013.01); *B62M 9/10* (2013.01); *F16H 9/24* (2013.01); *F16H 55/08* (2013.01); *F16H 55/30* (2013.01); *F16H 57/0025* (2013.01)

(58) Field of Classification Search
CPC . B62M 9/12; B62M 9/126; F16H 9/24; F16H 55/08; F16H 55/30; F16H 57/0025
See application file for complete search history.

(56) References Cited

U.S. PATENT DOCUMENTS

| | | | | |
|---|---|---|---|---|
| 5,759,124 | A  * | 6/1998 | Sung .................... | B62M 9/10 474/152 |
| 2008/0081719 | A1* | 4/2008 | Young .................. | F16H 7/06 474/152 |
| 2011/0053721 | A1* | 3/2011 | Kamada ............... | B62M 9/10 474/160 |
| 2017/0146109 | A1* | 5/2017 | Reiter .................. | B62M 9/105 |

* cited by examiner

*Primary Examiner* — Michael R Mansen
*Assistant Examiner* — Robert T Reese
(74) *Attorney, Agent, or Firm* — Mori & Ward, LLP

(57) ABSTRACT

A bicycle rear sprocket comprises a sprocket body and a plurality of sprocket teeth. The plurality of sprocket teeth includes at least one driving tooth configured to engage with a roller of a bicycle chain. The at least one driving tooth comprises a driving surface, a first tangential line, a first angle, a second tangential line, and a second angle. The driving surface includes a first driving surface and a second driving surface. The first driving surface has a first contact point. The second driving surface has a second contact point. The first angle is defined between the first tangential line and a reference line. The second angle is defined between the second tangential line and the reference line. The first angle is smaller than the second angle.

20 Claims, 16 Drawing Sheets

BICYCLE REAR SPROCKET AND BICYCLE REAR SPROCKET ASSEMBLY

BACKGROUND OF THE INVENTION

Field of the Invention

The present invention relates to a bicycle rear sprocket and a bicycle rear sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a sprocket.

SUMMARY OF THE INVENTION

In accordance with a first aspect of the present invention, a bicycle rear sprocket comprises a sprocket body and a plurality of sprocket teeth extending radially outwardly from the sprocket body with respect to a rotational center axis of the bicycle rear sprocket. The plurality of sprocket teeth includes at least one driving tooth configured to engage with a roller of a bicycle chain. The at least one driving tooth comprises a driving surface, a first tangential line, a first angle, a second tangential line, and a second angle. The driving surface includes a first driving surface and a second driving surface. The first driving surface is positioned radially outwardly of the second driving surface with respect to the rotational center axis. The first driving surface has a first contact point configured to contact the roller of the bicycle chain when the roller is on a pitch circle of the bicycle rear sprocket. The second driving surface has a second contact point configured to contact the roller when the roller is on the pitch circle of the bicycle rear sprocket. The first tangential line is defined at the first contact point on the first driving surface. The first angle is defined between the first tangential line and a reference line passing through the rotational center axis and a reference point. The reference point is offset from a roller center axis of the roller of the bicycle chain toward a downstream side with respect to a driving rotational direction of the bicycle rear sprocket by a half of a roller pitch of the bicycle chain in a state where the roller of the bicycle chain simultaneously contacts the first contact point and the second contact point. The second tangential line is defined at the second contact point on the second driving surface. The second angle is defined between the second tangential line and the reference line. The first angle is smaller than the second angle.

With the bicycle rear sprocket according to the first aspect, the first contact point and the second contact point make a position of the roller of the bicycle chain stable relative to the bicycle rear sprocket during pedaling. This makes rotation of the bicycle rear sprocket smooth.

In accordance with a second aspect of the present invention, the bicycle rear sprocket according to the first aspect is configured so that the driving surface includes an intermediate surface between the first contact point and the second contact point. The intermediate surface has a curved shape when viewed along the rotational center axis.

With the bicycle rear sprocket according to the second aspect, it is possible to make the position of the roller of the bicycle chain more stable relative to the bicycle rear sprocket during pedaling. This makes rotation of the bicycle rear sprocket smoother.

In accordance with a third aspect of the present invention, the bicycle rear sprocket according to the second aspect is configured so that a curvature of radius of the intermediate surface ranges from 95% to 105% of a radius of the roller when viewed along the rotational center axis.

With the bicycle rear sprocket according to the third aspect, it is possible to make the position of the roller of the bicycle chain more stable relative to the bicycle rear sprocket during pedaling. This makes rotation of the bicycle rear sprocket smoother.

In accordance with a fourth aspect of the present invention, the bicycle rear sprocket according to the second or third aspect is configured so that a curvature of radius of the intermediate surface ranges from 3.6 mm to 4 mm when viewed along the rotational center axis.

With the bicycle rear sprocket according to the fourth aspect, it is possible to make the position of the roller of the bicycle chain more stable relative to the bicycle rear sprocket during pedaling. This makes rotation of the bicycle rear sprocket smoother.

In accordance with a fifth aspect of the present invention, the bicycle rear sprocket according to any one of the second to fourth aspects is configured so that a curvature of radius of the intermediate surface is equal to or smaller than a radius of the roller when viewed along the rotational center axis.

With the bicycle rear sprocket according to the fifth aspect, it is possible to make the position of the roller of the bicycle chain more stable relative to the bicycle rear sprocket during pedaling. This makes rotation of the bicycle rear sprocket smoother.

In accordance with a sixth aspect of the present invention, the bicycle rear sprocket according to any one of the second to fifth aspects is configured so that the driving surface includes a radially inner surface provided radially inwardly of the second driving surface. The radially inner surface has a curved shape when viewed along the rotational center axis.

With the bicycle rear sprocket according to the sixth aspect, it is possible to make the position of the roller of the bicycle chain more stable relative to the bicycle rear sprocket during pedaling. This makes rotation of the bicycle rear sprocket smoother.

In accordance with a seventh aspect of the present invention, the bicycle rear sprocket according to the sixth aspect is configured so that the radially inner surface has a curvature of radius larger than a curvature of radius of the intermediate surface when viewed along the rotational center axis.

With the bicycle rear sprocket according to the seventh aspect, it is possible to make the position of the roller of the bicycle chain more stable relative to the bicycle rear sprocket during pedaling. This makes rotation of the bicycle rear sprocket smoother.

In accordance with an eighth aspect of the present invention, the bicycle rear sprocket according to any one of the first to seventh aspects is configured so that the first driving surface has a straight shape when viewed along the rotational center axis.

With the bicycle rear sprocket according to the eighth aspect, it is possible to make the position of the roller of the bicycle chain more stable relative to the bicycle rear sprocket during pedaling. This makes rotation of the bicycle rear sprocket smoother.

In accordance with a ninth aspect of the present invention, the bicycle rear sprocket according to any one of the first to eighth aspects is configured so that the first angle is equal to or smaller than 0 degree.

With the bicycle rear sprocket according to the ninth aspect, it is possible to make the position of the roller of the bicycle chain more stable relative to the bicycle rear sprocket during pedaling. This makes rotation of the bicycle rear sprocket smoother.

In accordance with a tenth aspect of the present invention, the bicycle rear sprocket according to any one of the first to ninth aspects is configured so that the first driving surface extends radially outwardly from the first contact point.

With the bicycle rear sprocket according to the tenth aspect, it is possible to make the position of the roller of the bicycle chain more stable relative to the bicycle rear sprocket during pedaling. This makes rotation of the bicycle rear sprocket smoother.

In accordance with an eleventh aspect of the present invention, the bicycle rear sprocket according to any one of the first to tenth aspects is configured so that the second driving surface extends radially inwardly from the second contact point.

With the bicycle rear sprocket according to the eleventh aspect, it is possible to make the position of the roller of the bicycle chain more stable relative to the bicycle rear sprocket during pedaling. This makes rotation of the bicycle rear sprocket smoother.

In accordance with a twelfth aspect of the present invention, the bicycle rear sprocket according to any one of the first to eleventh aspects is configured so that the at least one driving tooth is asymmetry with respect to the reference line.

With the bicycle rear sprocket according to the twelfth aspect, it is possible to make the position of the roller of the bicycle chain more stable relative to the bicycle rear sprocket during pedaling. This makes rotation of the bicycle rear sprocket smoother even if the driving tooth is asymmetrical relative to the reference line.

In accordance with a thirteenth aspect of the present invention, the bicycle rear sprocket according to any one of the first to twelfth aspects further comprises an outward facing side, an inward facing side, and an axially inward recess. The outward facing side faces in an axial direction parallel to the rotational center axis. The inward facing side faces in the axial direction. The inward facing side is opposite to the outward facing side in the axial direction. The axially inward recess is provided on the outward facing side to facilitate an inward shifting operation in which the bicycle chain is shifted from a smaller sprocket to the bicycle rear sprocket.

With the bicycle rear sprocket according to the thirteenth aspect, it is possible to make rotation of the bicycle rear sprocket smoother in the bicycle rear sprocket comprising the axially inward recess.

In accordance with a fourteenth aspect of the present invention, the bicycle rear sprocket according to any one of the first to thirteenth aspects further comprises an outward facing side, an inward facing side, and an axially outward recess. The outward facing side faces in an axial direction parallel to the rotational center axis. The inward facing side faces in the axial direction. The inward facing side is opposite to the outward facing side in the axial direction. The axially outward recess is provided on the outward facing side to facilitate an outward shifting operation in which the bicycle chain is shifted from the bicycle rear sprocket to a smaller sprocket.

With the bicycle rear sprocket according to the fourteenth aspect, it is possible to make rotation of the bicycle rear sprocket smoother in the bicycle rear sprocket comprising the axially outward recess.

In accordance with a fifteenth aspect of the present invention, the bicycle rear sprocket according to any one of the first to fourteenth aspect further comprises an outward facing side, an inward facing side, and an axially outward recess. The outward facing side faces in an axial direction parallel to the rotational center axis. The inward facing side faces in the axial direction. The inward facing side is opposite to the outward facing side in the axial direction. The axially outward recess is provided on the inward facing side to facilitate an outward shifting operation in which the bicycle chain is shifted from the bicycle rear sprocket to a smaller sprocket.

With the bicycle rear sprocket according to the fifteenth aspect, it is possible to make rotation of the bicycle rear sprocket smoother in the bicycle rear sprocket comprising the axially outward recess on the inward facing side.

In accordance with a sixteenth aspect of the present invention, the bicycle rear sprocket according to any one of the first to fifteenth aspects is configured so that the plurality of sprocket teeth includes a plurality of tooth bottoms defining a root circle. The at least one driving tooth includes an axial maximum tooth-width and a radial maximum tooth-height. The axial maximum tooth-width is defined in an axial direction of the rotational center axis as a maximum width in the at least one driving tooth. The radial maximum tooth-height is defined from the root circle to a radially outer end of the at least one driving tooth in a radial direction of the rotational center axis as a maximum height in the at least one driving tooth. The radial maximum tooth-height being larger than the axial maximum tooth-width.

With the bicycle rear sprocket according to the sixteenth aspect, it is possible to makes rotation of the bicycle rear sprocket smoother in the bicycle rear sprocket comprising the axially inward recess.

In accordance with a seventeenth aspect of the present invention, the bicycle rear sprocket according to any one of the first to sixteenth aspects is configured so that the plurality of sprocket teeth includes a plurality of tooth bottoms defining a root circle. A radial distance defined from the root circle to the pitch circle of the bicycle rear sprocket is larger than 4.2 mm.

With the bicycle rear sprocket according to the seventeenth aspect, it is possible to make rotation of the bicycle rear sprocket smoother in the bicycle rear sprocket comprising the root circle provided closer to the rotational center axis.

In accordance with a third aspect of the present invention, a bicycle rear sprocket assembly comprises the bicycle rear sprocket according to any one of the first to seventeenth aspects. The bicycle rear sprocket includes a hub engagement portion configured to engage with the bicycle hub assembly.

With the bicycle rear sprocket assembly according to the eighteenth aspect, it is possible to make rotation of the bicycle rear sprocket smoother in the bicycle rear sprocket including the hub engagement portion.

In accordance with a nineteenth aspect of the present invention, the bicycle rear sprocket assembly according to the eighteenth aspect further comprises a sprocket support configured to engage with the bicycle hub assembly. The sprocket support includes a sprocket attachment part. The bicycle rear sprocket being attached to the sprocket attachment part.

With the bicycle rear sprocket assembly according to the nineteenth aspect, it is possible to make rotation of the bicycle rear sprocket smoother in the bicycle rear sprocket comprising the sprocket support.

In accordance with a twentieth aspect of the present invention, the bicycle rear sprocket assembly according to the nineteenth aspect is configured so that the sprocket support includes a hub engagement part configured to engage with the bicycle hub assembly.

With the bicycle rear sprocket according to the twentieth aspect, it is possible to make rotation of the bicycle rear sprocket smoother in the bicycle rear sprocket comprising the sprocket support including the hub engagement part.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
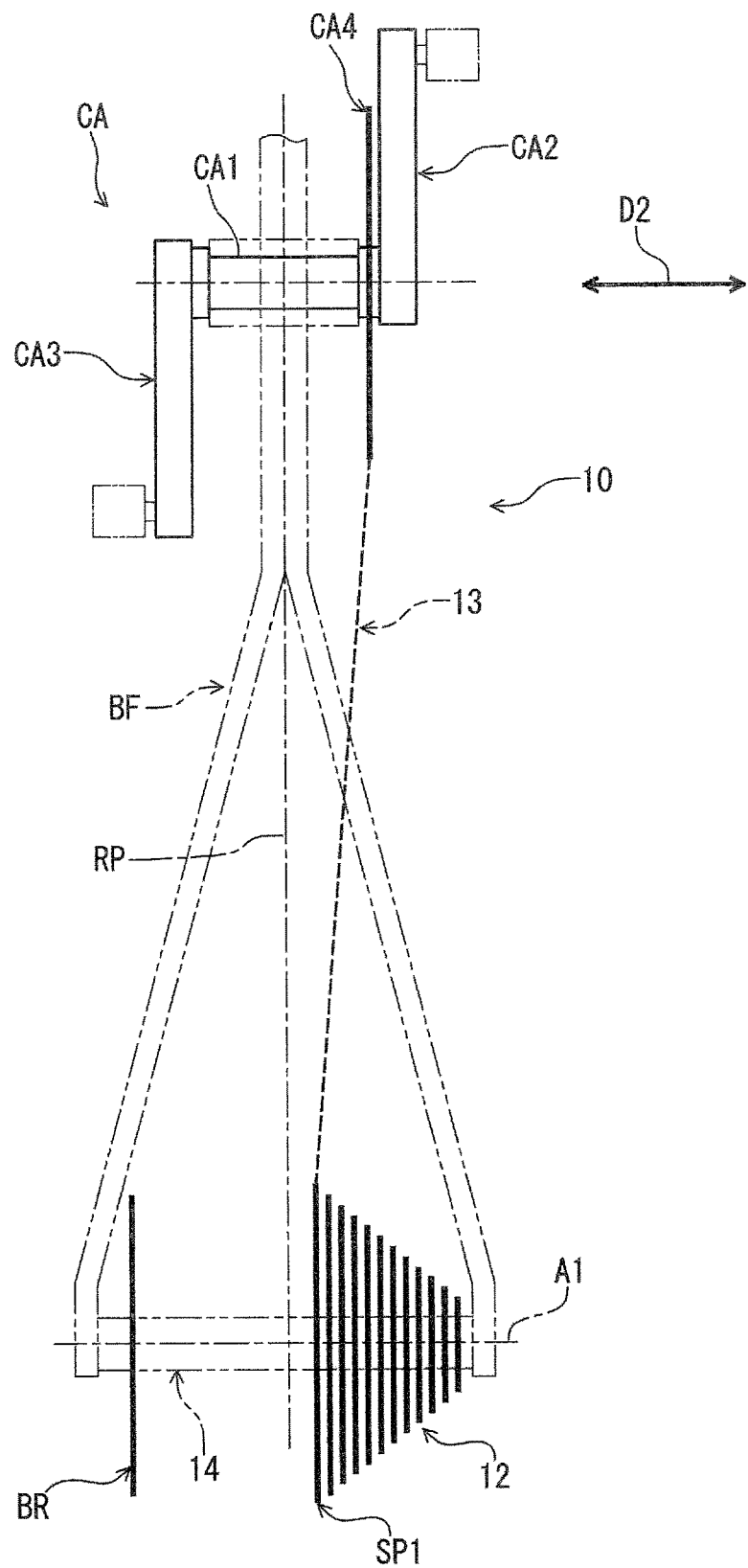
FIG. 1 is a schematic diagram of a bicycle drive train including a bicycle rear sprocket assembly in accordance with an embodiment.

The embodiment(s) will now be described with reference to the accompanying drawings, wherein like reference numerals designate corresponding or identical elements throughout the various drawings.

Referring initially to FIG. 1, a bicycle drive train 10 comprises a bicycle rear sprocket assembly 12 in accordance with an embodiment and a bicycle chain 13. The bicycle rear sprocket assembly 12 is configured to engage with the bicycle chain 13. The bicycle drive train 10 comprises a bicycle hub assembly 14. The bicycle hub assembly 14 is secured to a bicycle frame BF. The bicycle rear sprocket assembly 12 is mounted on the bicycle hub assembly 14. A bicycle brake rotor BR is mounted on the bicycle hub assembly 14.

The bicycle drive train 10 further comprises a crank assembly CA. The crank assembly CA includes a crank axle CA1, a right crank arm CA2, a left crank arm CA3, and a front sprocket CA4. The right crank arm CA2 and the left crank arm CA3 are secured to the crank axle CA1. The front sprocket CA4 is secured to at least one of the crank axle CA1 and the right crank arm CA2. The bicycle chain 13 is engaged with the front sprocket CA4 and the bicycle rear sprocket assembly 12 to transmit a pedaling force from the front sprocket CA4 to the bicycle rear sprocket assembly 12. The crank assembly CA includes the front sprocket CA4 as a single sprocket in the illustrated embodiment. However, the crank assembly CA can include a plurality of front sprockets. The bicycle rear sprocket assembly 12 is a rear sprocket assembly. However, structures of the bicycle rear sprocket assembly 12 can be applied to the front sprocket.

Figure 2:
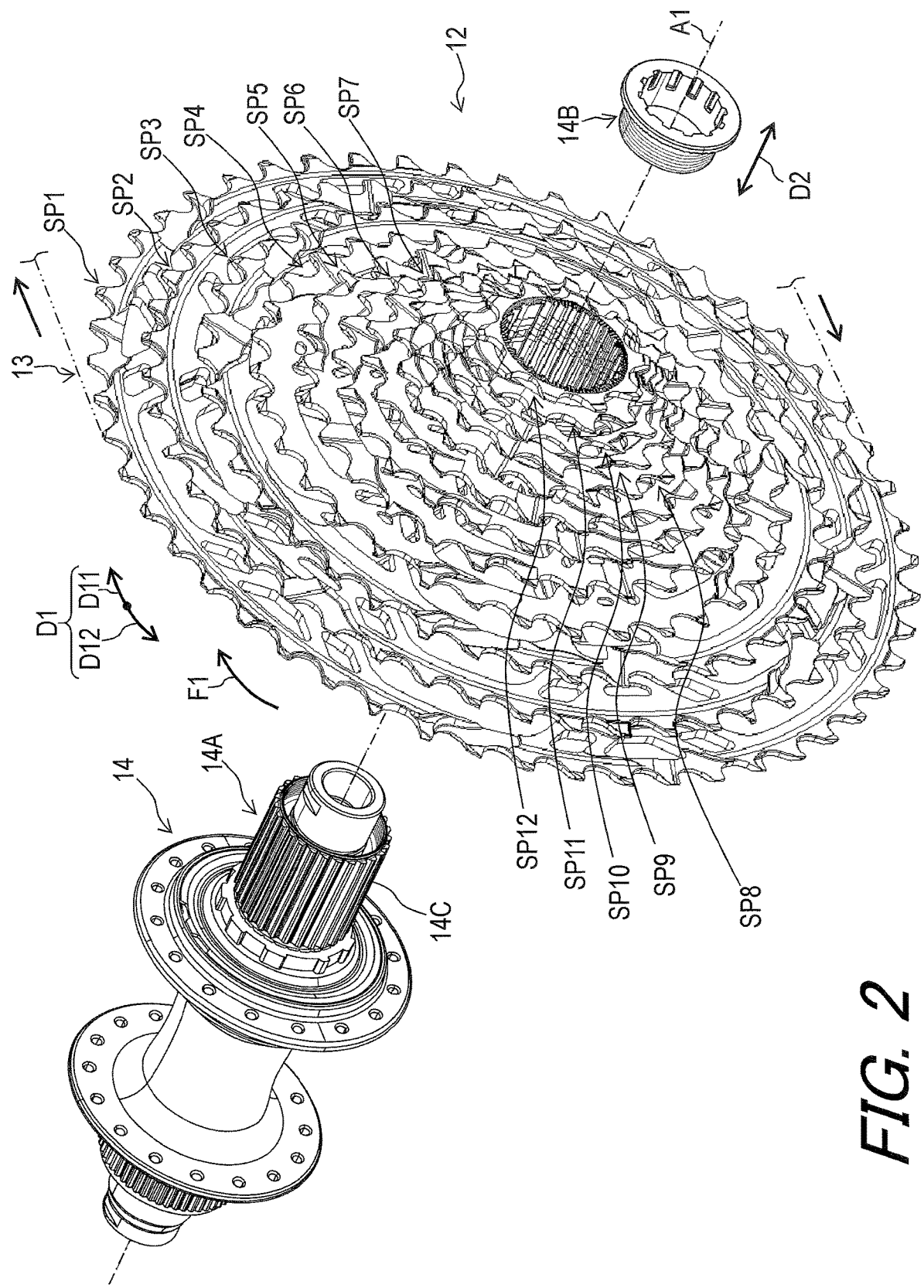
FIG. 2 is a perspective view of the bicycle rear sprocket assembly including a bicycle rear sprocket in accordance with an embodiment, with a bicycle hub assembly and a lock ring.

As seen in FIG. 2, the bicycle rear sprocket assembly 12 comprises a bicycle rear sprocket SP1 For example, the bicycle rear sprocket assembly 12 comprises a bicycle rear sprocket SP11. The bicycle rear sprocket assembly 12 in accordance with the embodiment comprises a plurality of bicycle rear sprockets SP1 to SP12. However, a total number of sprockets of the bicycle rear sprocket assembly 12 is not limited to this embodiment.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle drive train 10, the bicycle rear sprocket assembly 12, or the bicycle rear sprocket SP1 should be interpreted relative to the bicycle equipped with the bicycle drive train 10, the bicycle rear sprocket assembly 12, or the bicycle rear sprocket SP1 as used in an upright riding position on a horizontal surface.

As seen in FIG. 2, the bicycle rear sprocket assembly 12 has a rotational center axis A1. The bicycle rear sprocket assembly 12 is rotatably supported by the bicycle hub assembly 14 relative to the bicycle frame BF (FIG. 1) about the rotational center axis A1. The bicycle rear sprocket assembly 12 is secured to a sprocket support body 14A of the bicycle hub assembly 14 with a lock ring 14B. The bicycle rear sprocket assembly 12 is configured to be engaged with the bicycle chain 13 to transmit a driving rotational force F1 between the bicycle chain 13 and the bicycle rear sprocket assembly 12 during pedaling. The bicycle rear sprocket assembly 12 is rotated about the rotational center axis A1 in a driving rotational direction D11 during pedaling. The driving rotational direction D11 is defined along a circumferential direction D1 of the bicycle hub assembly 14 or the bicycle rear sprocket assembly 12. A reverse rotational direction D12 is an opposite direction of the driving rotational direction D11 and is defined along the circumferential direction D1.

Figure 3:
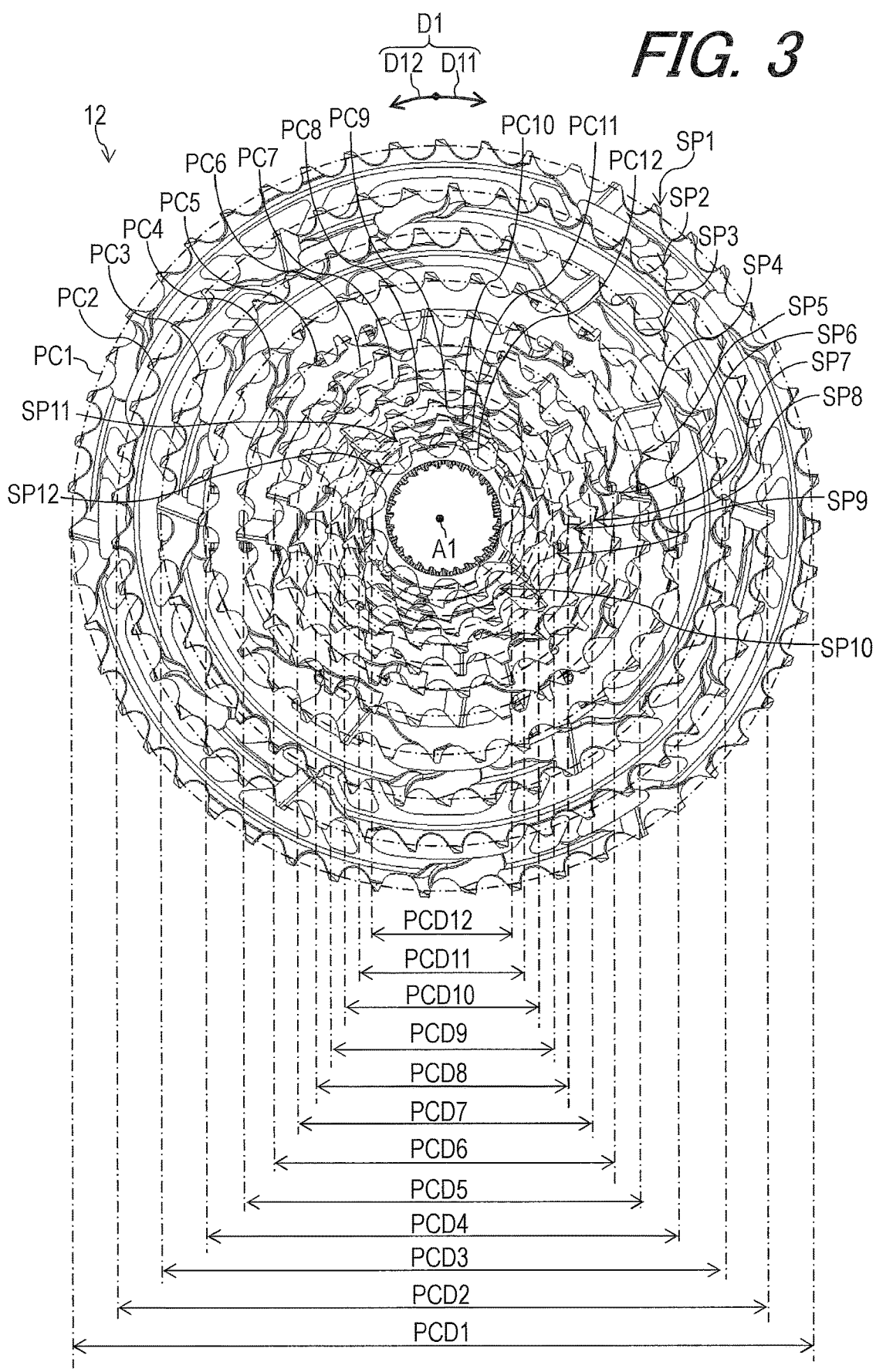
FIG. 3 is a side elevational view of the bicycle rear sprocket assembly illustrated in FIG. 1.

As seen in FIG. 3, the bicycle rear sprocket SP1 has a first pitch-circle diameter PCD1. The bicycle rear sprocket SP2 has a second pitch-circle diameter PCD2. The bicycle rear sprocket SP3 has a third pitch-circle diameter PCD3. The bicycle rear sprocket SP4 has a fourth pitch-circle diameter PCD4. The bicycle rear sprocket SP5 has a fifth pitch-circle diameter PCD5. The bicycle rear sprocket SP6 has a sixth pitch-circle diameter PCD6. The bicycle rear sprocket SP7 has a seventh pitch-circle diameter PCD7. The bicycle rear sprocket SP8 has an eighth pitch-circle diameter PCD8. The bicycle rear sprocket SP9 has a ninth pitch-circle diameter PCD9. The bicycle rear sprocket SP10 has a tenth pitch-circle diameter PCD10. The bicycle rear sprocket SP11 has an eleventh pitch-circle diameter PCD11. The bicycle rear sprocket SP12 has a twelfth pitch-circle diameter PCD12.

The bicycle rear sprocket SP1 has a pitch circle PC1 having the first pitch-circle diameter PCD1. The bicycle rear sprocket SP2 has a pitch circle PC2 having the second pitch-circle diameter PCD2. The bicycle rear sprocket SP3 has a pitch circle PC3 having the third pitch-circle diameter PCD3. The bicycle rear sprocket SP4 has a pitch circle PC4 having the fourth pitch-circle diameter PCD4. The bicycle rear sprocket SP5 has a pitch circle PC5 having the fifth pitch-circle diameter PCD5. The bicycle rear sprocket SP6 has a pitch circle PC6 having the sixth pitch-circle diameter PCD6. The bicycle rear sprocket SP7 has a pitch circle PC7 having the seventh pitch-circle diameter PCD7. The bicycle rear sprocket SP8 has a pitch circle PC8 having the eighth pitch-circle diameter PCD8. The bicycle rear sprocket SP9 has a pitch circle PC9 having the ninth pitch-circle diameter PCD9. The bicycle rear sprocket SP10 has a pitch circle PC10 having the tenth pitch-circle diameter PCD10. The bicycle rear sprocket SP11 has a pitch circle PC11 having the eleventh pitch-circle diameter PCD11. The bicycle rear sprocket SP12 has a pitch circle PC12 having the twelfth pitch-circle diameter PCD12.

The pitch circle PC1 is defined by center axes of pins of the bicycle chain 13 (FIG. 2) engage with the bicycle rear sprocket SP1. The pitch circles PC2 to PC12 are defined as well as the pitch circle PC1. Thus, they will not be descried in detail here for the sake of brevity.

In this embodiment, the first pitch-circle diameter PCD1 is larger than the second pitch-circle diameter PCD2. The second pitch-circle diameter PCD2 is larger than the third pitch-circle diameter PCD3. The third pitch-circle diameter PCD3 is larger than the fourth pitch-circle diameter PCD4. The first pitch-circle diameter PCD1 is the largest pitch-circle diameter in the bicycle rear sprocket assembly 12. The twelfth pitch-circle diameter PCD12 is the smallest pitch-circle diameter in the bicycle rear sprocket assembly 12. The bicycle rear sprocket SP1 corresponds to low gear in the bicycle rear sprocket assembly 12. The bicycle rear sprocket SP12 corresponds to top gear in the bicycle rear sprocket assembly 12. However, the bicycle rear sprocket SP1 can correspond to another gear in the bicycle rear sprocket assembly 12.

Figure 4:
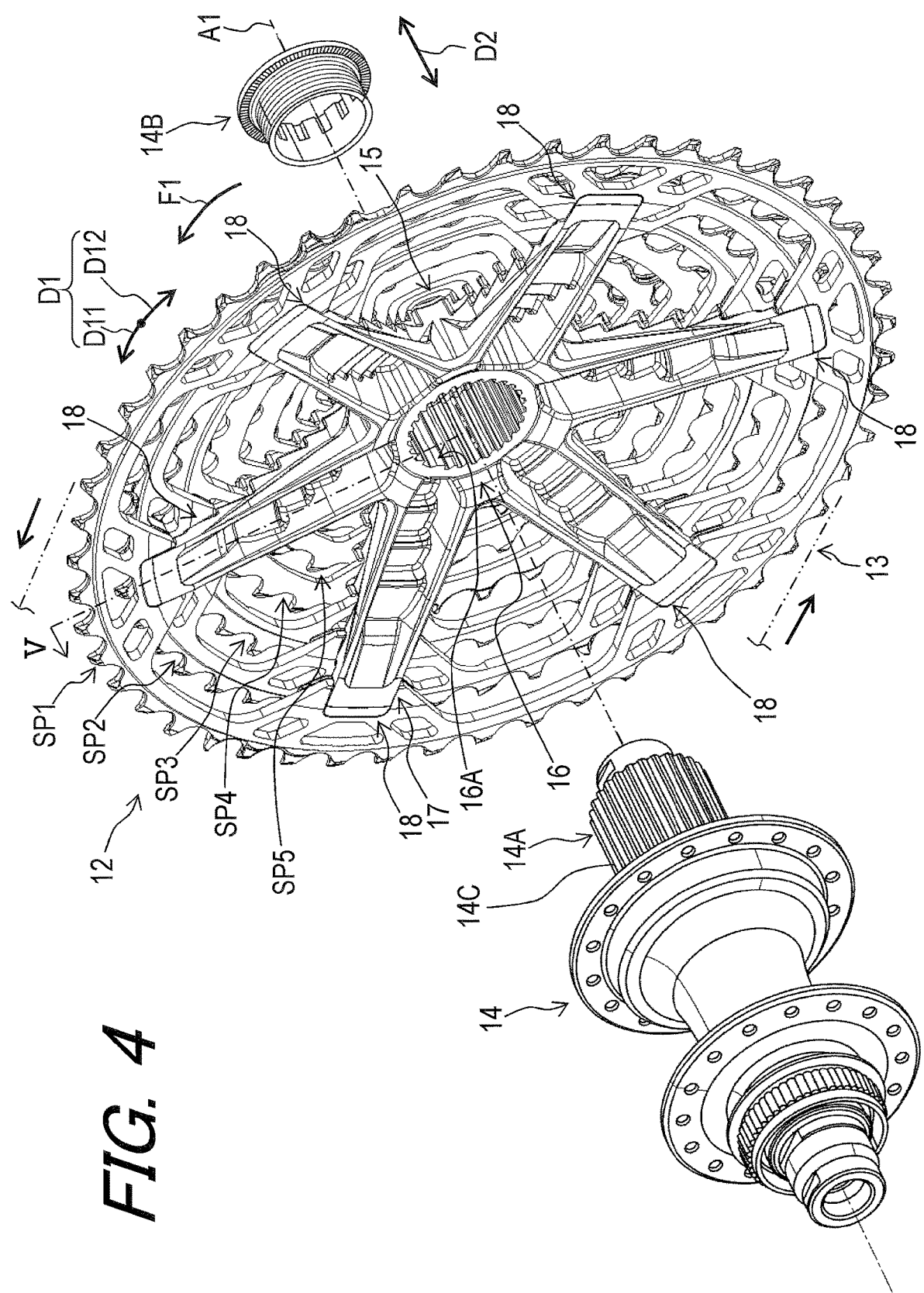
FIG. 4 is another perspective view of the bicycle rear sprocket assembly illustrated in FIG. 1, with the bicycle hub assembly and the lock ring.

As seen in FIG. 4, the bicycle rear sprocket assembly 12 further comprises a sprocket support 15 configured to engage with the bicycle hub assembly 14. The sprocket support 15 is configured to engage with the bicycle hub assembly 14. In this embodiment, the sprocket support 15 includes a hub engagement part 16 configured to engage with the bicycle hub assembly 14. However, the hub engagement part 16 can be omitted from the bicycle rear sprocket assembly 12 or can be provided at positions other than the sprocket support 15. The hub engagement part 16 includes an internal spline 16A. The sprocket support body 14A of the bicycle hub assembly 14 includes an external spline 14C. The internal spline 16A of the hub engagement part 16 is engageable with the external spline 14C of the sprocket support body 14A to transmit the driving rotational force F1 between the bicycle rear sprocket assembly 12 and the bicycle hub assembly 14. The sprocket support 15 includes a sprocket attachment part 17. The sprocket support 15 includes a sprocket attachment part 17. For example, the bicycle rear sprocket SP1 is attached to the sprocket attachment part 17. The sprocket attachment part 17 includes a plurality of support arms 18 extending radially outwardly from the hub engagement part 16. In this embodiment, the sprocket attachment part 17 includes six support arms 18. However, a total number of the support arms 18 is not limited to this embodiment.

Figure 5:
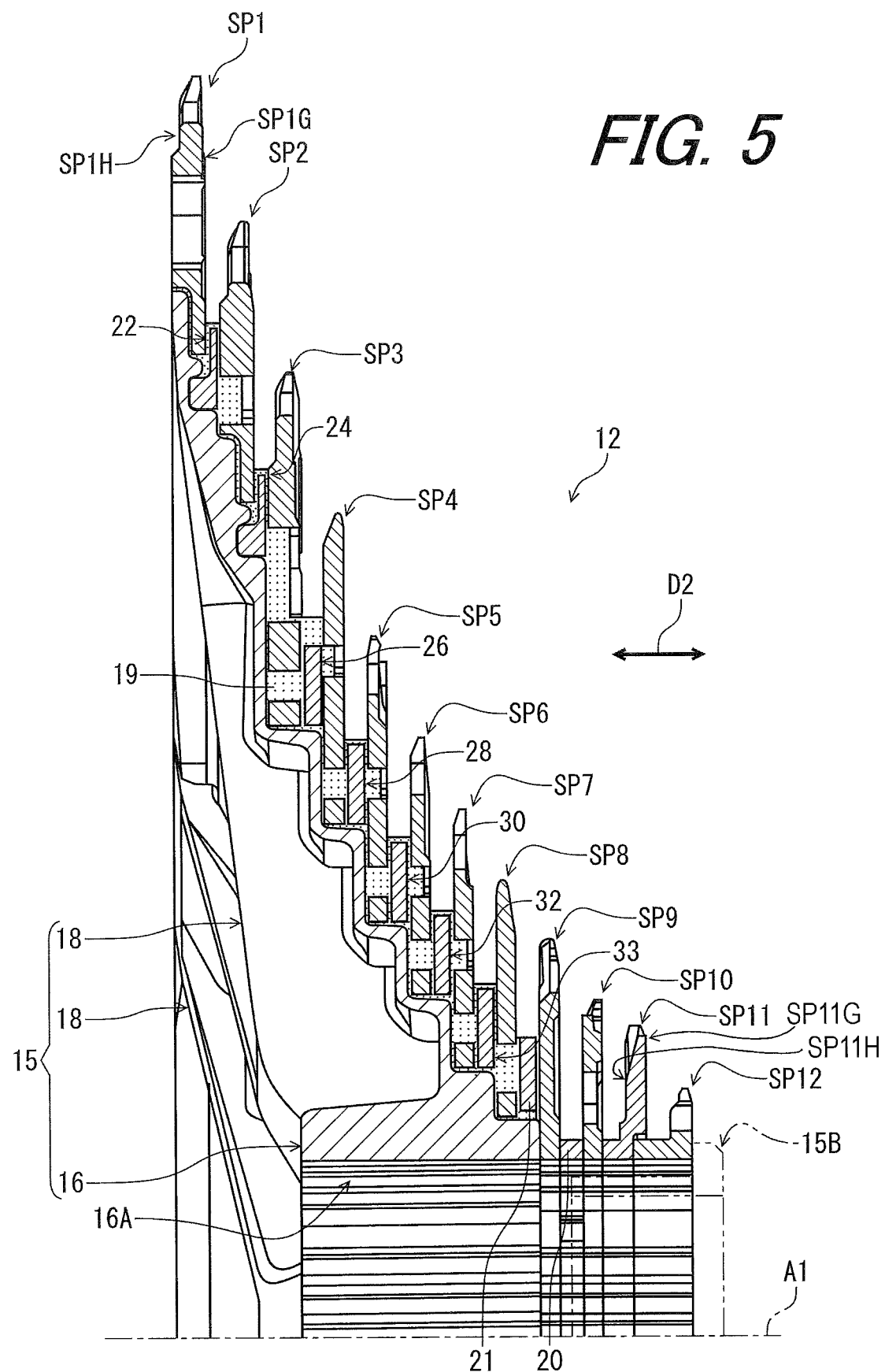
FIG. 5 is a cross-sectional view of the bicycle rear sprocket assembly taken along line V-V of FIG. 4.

As seen in FIG. 5, the bicycle rear sprockets SP1 to SP12 are arranged in this order in an axial direction D2 parallel to the rotational center axis A1. The bicycle rear sprocket SP1 is adjacent to the bicycle rear sprocket SP2 without another sprocket between the bicycle rear sprocket SP1 and the bicycle rear sprocket SP2 in the axial direction D2 with respect to the rotational center axis A1. The bicycle rear sprocket SP2 is adjacent to the bicycle rear sprocket SP3 without another sprocket between the bicycle rear sprocket SP2 and the bicycle rear sprocket SP3 in the axial direction D2 with respect to the rotational center axis A1. The bicycle rear sprocket SP3 is adjacent to the bicycle rear sprocket SP4 without another sprocket between the bicycle rear sprocket SP3 and the bicycle rear sprocket SP4 in the axial direction D2 with respect to the rotational center axis A1. The bicycle rear sprockets SP12 are arranged in the axial direction D2 in this order.

The bicycle rear sprocket SP1 and the bicycle rear sprocket SP2 are attached to the sprocket attachment part 17. The bicycle rear sprocket SP3 and the bicycle rear sprocket SP4 are attached to the sprocket attachment part 17. The bicycle rear sprocket SP1 and the bicycle rear sprocket SP2 are attached to the plurality of support arms 18. At least one of the bicycle rear sprockets SP5 to SP12 are attached to at least one of the hub engagement part 16 and the sprocket attachment part 17. In this embodiment, the bicycle rear sprockets SP3 to SP8 are attached to the plurality of support arms 18. The bicycle rear sprockets SP8 and SP9 are attached to the hub engagement part 16.

Figure 6:
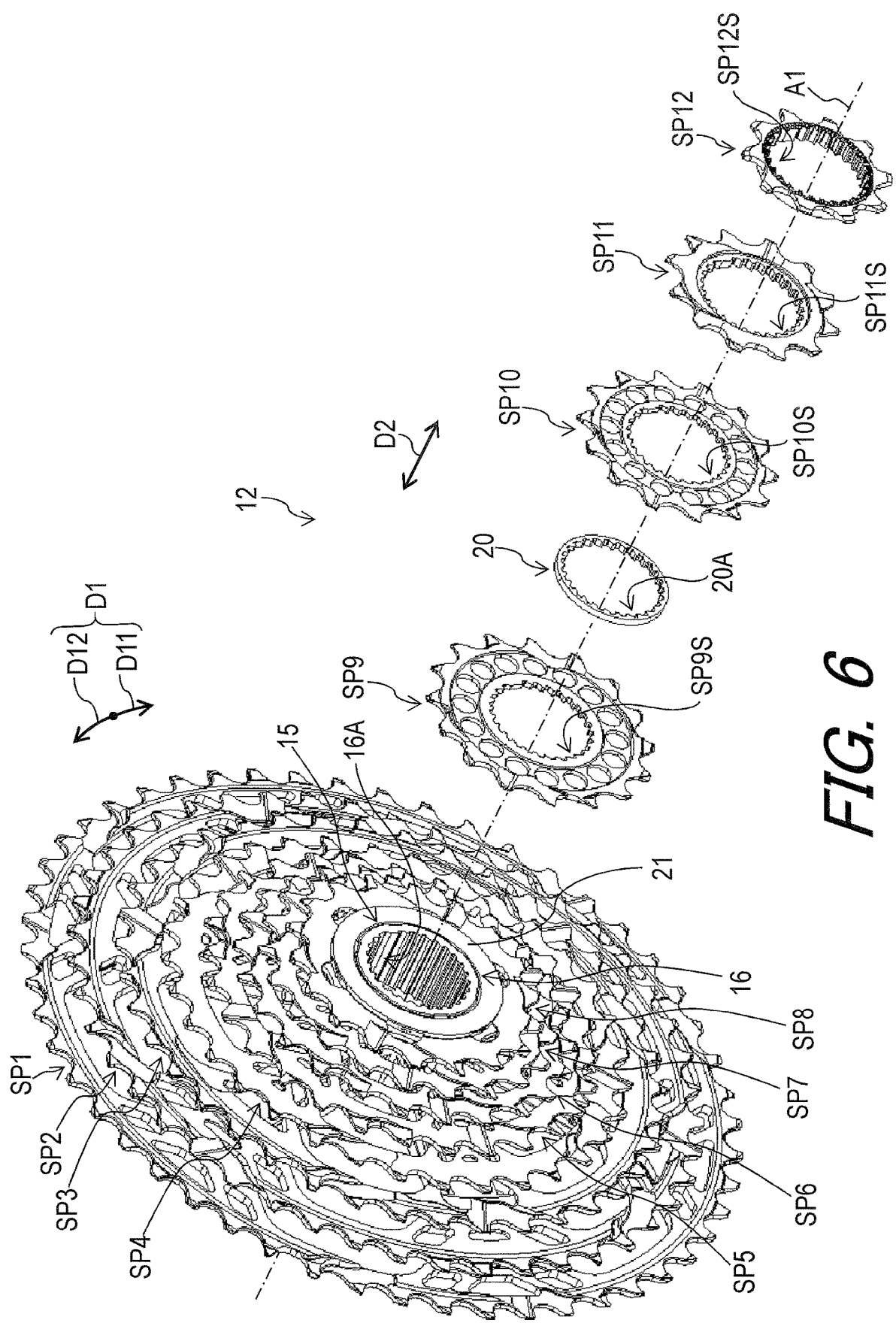
FIG. 6 is an exploded perspective view of the bicycle rear sprocket assembly illustrated in FIG. 2.

As seen in FIG. 6, the bicycle rear sprocket assembly 12 comprises an intermediate ring 20 and a ring cover 21. The intermediate ring 20 is provided between the bicycle rear sprocket SP9 and the bicycle rear sprocket SP10 in the axial direction D2. The ring cover 21 is provided between the bicycle rear sprocket SP8 and the bicycle rear sprocket SP9 in the axial direction D2. The bicycle rear sprockets SP1 to SP8 and the ring cover 21 are mounted on the sprocket support 15. The bicycle rear sprockets SP9 to SP12 and the intermediate ring 20 are not mounted on the sprocket support 15. In this embodiment, the bicycle rear sprocket SP9 includes a hub engagement portion SP9S configured to engage with the bicycle hub assembly 14. The bicycle rear sprocket SP10 includes a hub engagement portion SP10S configured to engage with the bicycle hub assembly 14. The bicycle rear sprocket SP11 includes a hub engagement portion SP11S configured to engage with the bicycle hub assembly 14. The bicycle rear sprocket SP12 includes a hub engagement portion SP12S configured to engage with the bicycle hub assembly 14. For example, the hub engagement portion SP9S includes an internal spline to engage with the external spline 14C of the bicycle hub assembly 14. The hub engagement portion SP includes an internal spline to engage with the external spline 14C of the bicycle hub assembly 14. The hub engagement portion SP11S includes an internal spline to engage with the external spline 14C of the bicycle hub assembly 14. The hub engagement portion SP12S includes an internal spline to engage with the external spline 14C of the bicycle hub assembly 14. The intermediate ring 20 includes an internal spline 20A to engage with the external spline 14C of the bicycle hub assembly 14.

As seen in FIG. 5, the bicycle rear sprockets SP9 to SP12 and the intermediate ring 20 are held between the sprocket support 15 and the lock ring 14B in a state where the bicycle rear sprocket assembly 12 is mounted on the bicycle hub assembly 14 (FIG. 2). The bicycle rear sprockets SP9 to SP12 and the intermediate ring 20 are not attached to each other. However, at least one of the bicycle rear sprockets SP9 to SP12 and the intermediate ring 20 can be attached to an adjacent member.

The bicycle rear sprockets SP1 to SP8 are attached to the sprocket support 15 in this embodiment. The ring cover 21 is attached to at least one of the sprocket support 15 and the bicycle rear sprocket SP8. For example, the bicycle rear sprockets SP1 to SP8 are attached to the sprocket support 15 with a bonding structure such as adhesive without a metallic fastener. For example, the bicycle rear sprocket assembly 12 comprises an adhesive 19. This structure saves weight of the bicycle rear sprocket assembly 12. However, at least one of the bicycle rear sprockets SP1 to SP12 can be attached to the sprocket support 15 with a metallic fastener.

In this embodiment, the bicycle rear sprockets SP1 to SP12, the intermediate ring 20, and the ring cover 21 are separate members from each other. However, at least one of the bicycle rear sprockets SP1 to SP12, the intermediate ring 20, and the ring cover 21 can be integrally provided with another of the bicycle rear sprockets SP1 to SP12, the intermediate ring 20, and the ring cover 21 as a one-piece unitary member.

The bicycle rear sprocket SP1 is made of a first metallic material. Each of the bicycle rear sprockets SP2 to SP12 is made of the first metallic material. The first metallic material includes aluminum. However, the first metallic material can include another metallic material such as iron, titanium, and stainless steel. At least one of the bicycle rear sprockets SP1 to SP12 can include a non-metallic material. The sprocket support 15 is made of a material including a non-metallic material such as a resin material, fiber-reinforced-plastic and carbon-fiber-reinforced-plastic. However, the material of the sprocket support 15 can include a metallic material such as iron, aluminum, titanium, and stainless steel.

Figure 7:
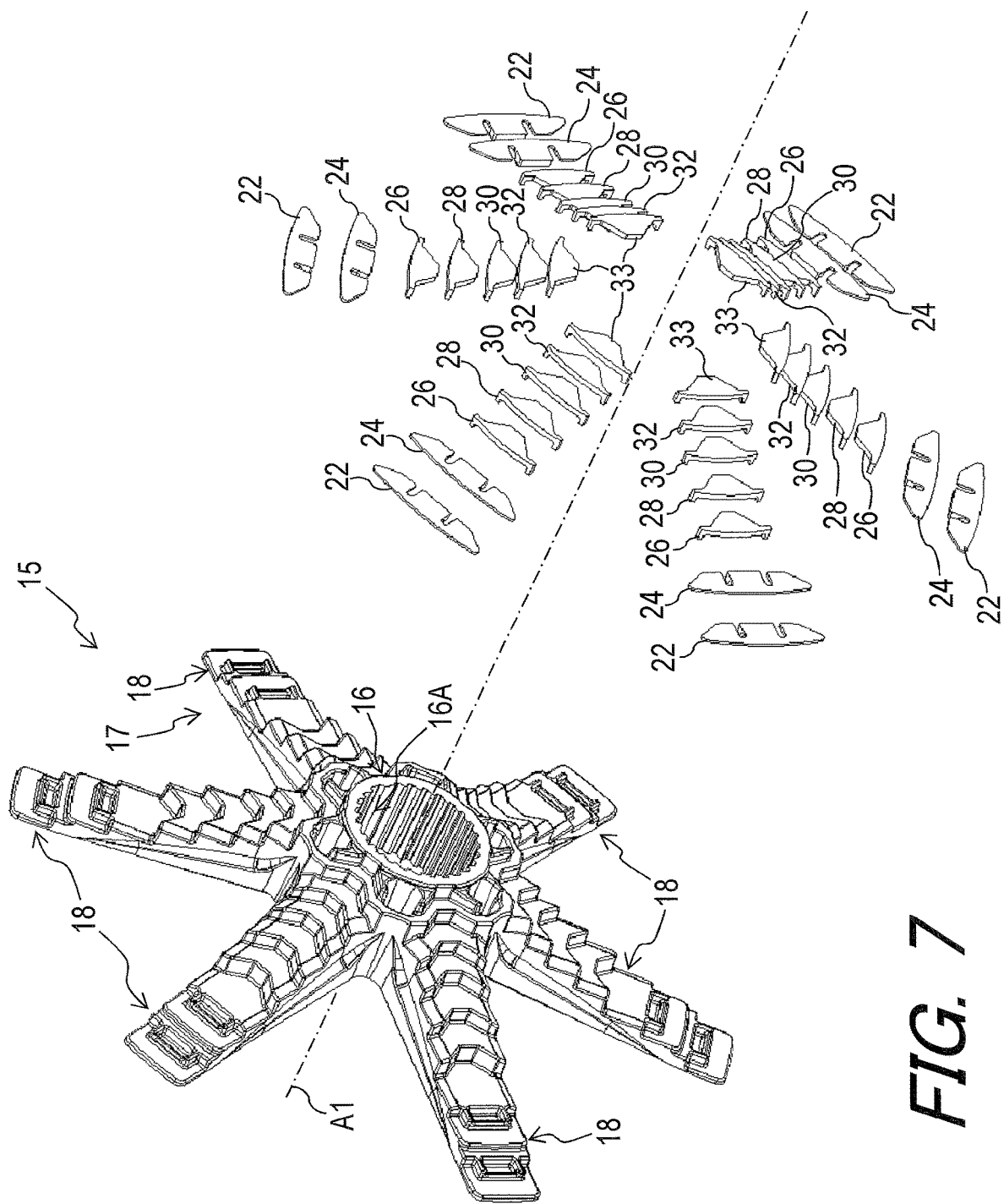
FIG. 7 is a perspective view of a sprocket support and a plurality of spacers of the bicycle rear sprocket assembly illustrated in FIG. 2.
Figure 8:
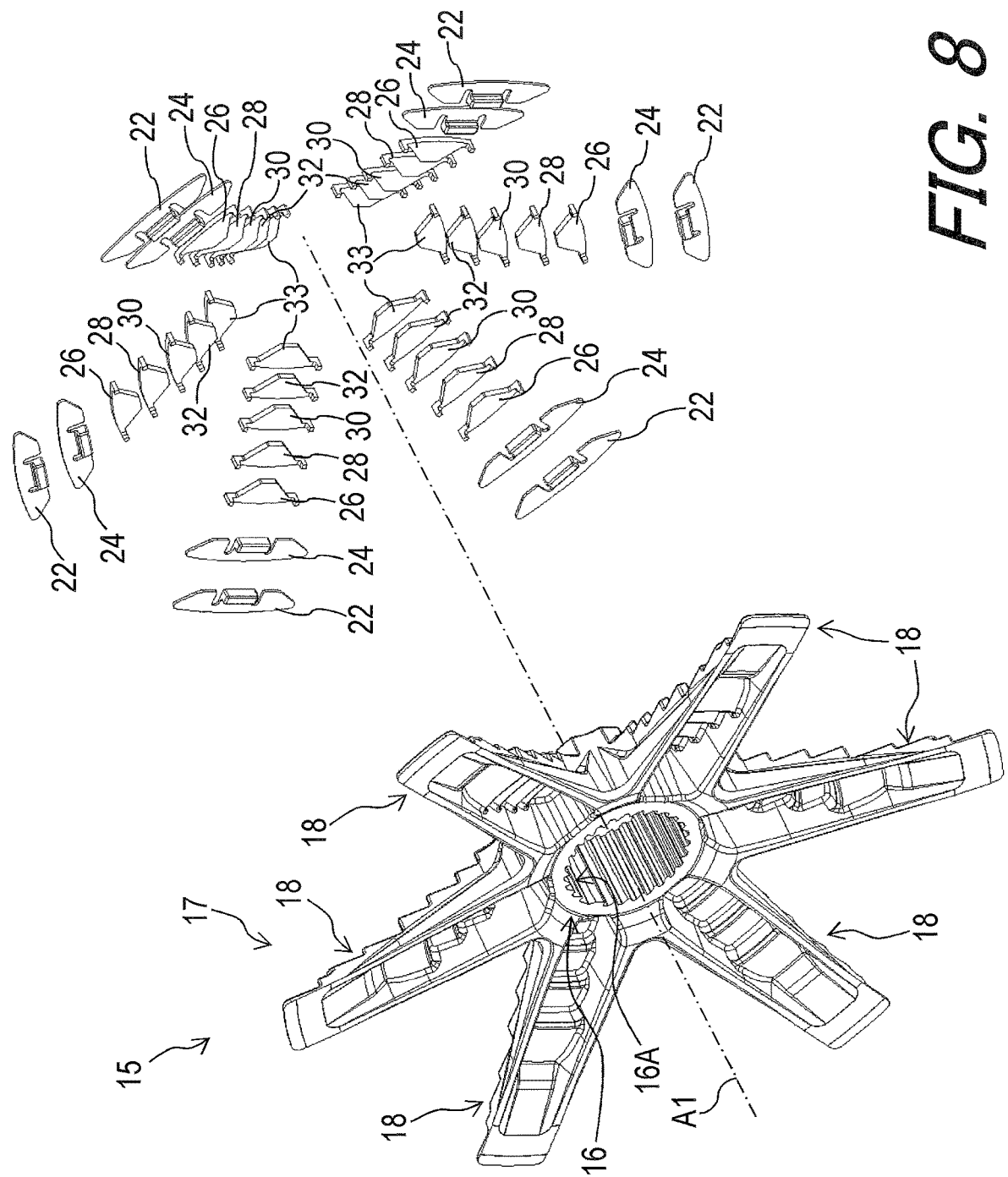
FIG. 8 is another perspective view of the sprocket support and the plurality of spacers of the bicycle rear sprocket assembly illustrated in FIG. 2.

As seen in FIGS. 7 and 8, the bicycle rear sprocket assembly 12 comprises a plurality of first spacers 22, a plurality of second spacers 24, a plurality of third spacers 26, a plurality of fourth spacers 28, a plurality of fifth spacers 30, a plurality of sixth spacers 32, and a plurality of seventh spacers 33. Each of the first to seventh spacers 22 to 33 is made of a non-metallic material such as a resin material. However, the first to seventh spacers 22 to 33 can be made of a metallic material.

A total number of the first spacers 22 is equal to the total number of the support arms 18. A total number of the second spacers 24 is equal to the total number of the support arms 18. A total number of the third spacers 26 is equal to the total number of the support arms 18. A total number of the fourth spacers 28 is equal to the total number of the support arms 18. A total number of the fifth spacers 30 is equal to the total number of the support arms 18. A total number of the sixth spacers 32 is equal to the total number of the support arms 18. A total number of the seventh spacers 33 is equal to the total number of the support arms 18. However, the total number of the first spacers 22 is not limited to this embodiment. The total number of the second spacers 24 is not limited to this embodiment. The total number of the third spacers 26 is not limited to this embodiment. The total number of the fourth spacers 28 is not limited to this embodiment. The total number of the fifth spacers 30 is not limited to this embodiment. The total number of the sixth spacers 32 is not limited to this embodiment. The total number of the seventh spacers 33 is not limited to this embodiment.

As seen in FIG. 5, the bicycle rear sprocket SP1 has an outward facing side SP and an inward facing side SP1H. The outward facing side SP1G faces in the axial direction D2 parallel to the rotational center axis A1. The inward facing side SP1H faces in the axial direction D2. The inward facing side SP1H is opposite to the outward facing side SP1G in the axial direction D2. The outward facing side SP faces toward the bicycle rear sprocket SP2 in the axial direction D2.

The bicycle rear sprocket SP11 further comprises an outward facing side SP and an inward facing side SP11H. The outward facing side SP11G faces in the axial direction D2 parallel to the rotational center axis A1. The inward facing side faces SP1111 in the axial direction D2. The inward facing side SP11H is opposite to the outward facing side SP11G in the axial direction D2. The outward facing side SP11G faces toward the bicycle rear sprocket SP12 in the axial direction D2. The inward facing side SP11H faces toward the bicycle rear sprocket SP10 in the axial direction D2.

Figure 9:
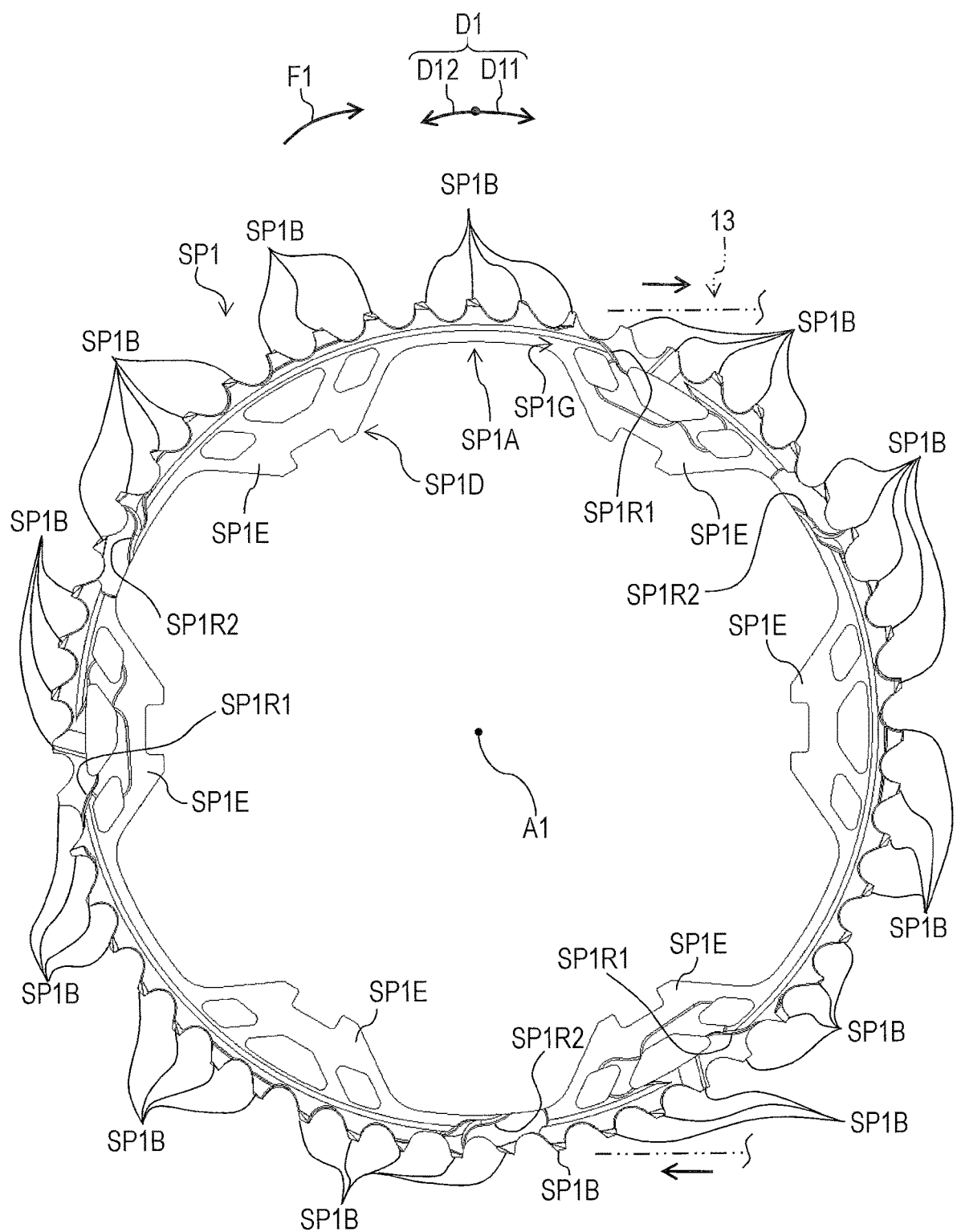
FIG. 9 is a side elevational view of a bicycle rear sprocket of the bicycle rear sprocket assembly illustrated in FIG. 2.

As seen in FIG. 9, the bicycle rear sprocket SP1 has the rotational center axis A1. The bicycle rear sprocket SP1 is configured to engage with the bicycle chain 13. The bicycle rear sprocket SP1 comprises a sprocket body SP1A and a plurality of sprocket teeth SP1B. The sprocket body SP1A is rotatable about the rotational center axis A1. The plurality of sprocket teeth SP1B extends radially outward from the sprocket body SP1A with respect to the rotational center axis A1 of the bicycle rear sprocket SP1.

The sprocket body SP1A includes a support attachment part SP1D attached to the sprocket support 15 (FIG. 5). The support attachment part SP1D includes a plurality of attachment portions SP1E attached to the plurality of support arms 18 (FIG. 5). A total number of the first attachment portions SP1E is equal to the total number of the support arms 18 (FIG. 5). However, the total number of the attachment portions SP1E is not limited to this embodiment. At least one of the attachment portions SP1E can be omitted from the bicycle rear sprocket SP1.

The bicycle rear sprocket SP1 further comprises an axially inward recess SP1R1 provided on the outward facing side SP to facilitate an inward shifting operation in which the bicycle chain 13 is shifted from the smaller sprocket SP2 to the bicycle rear sprocket SP1. The sprocket body SP1A includes an axially outward recess SP1R2 provided on the outward facing side SP1G to facilitate an outward shifting operation in which the bicycle chain 13 is shifted from the bicycle rear sprocket SP1 to the smaller sprocket SP2 (FIG. 5).

In this embodiment, the bicycle rear sprocket SP1 comprises a plurality of axially inward recesses SP1R1 provided on the outward facing side SP1G to facilitate the inward shifting operation. The bicycle rear sprocket SP1 comprises a plurality of axially outward recesses SP1R2 provided on the outward facing side SP to facilitate the outward shifting operation. However, a total number of the axially inward recesses SP1R1 is not limited to this embodiment. A total number of the axially outward recesses SP1R2 is not limited to this embodiment.

Figure 10:
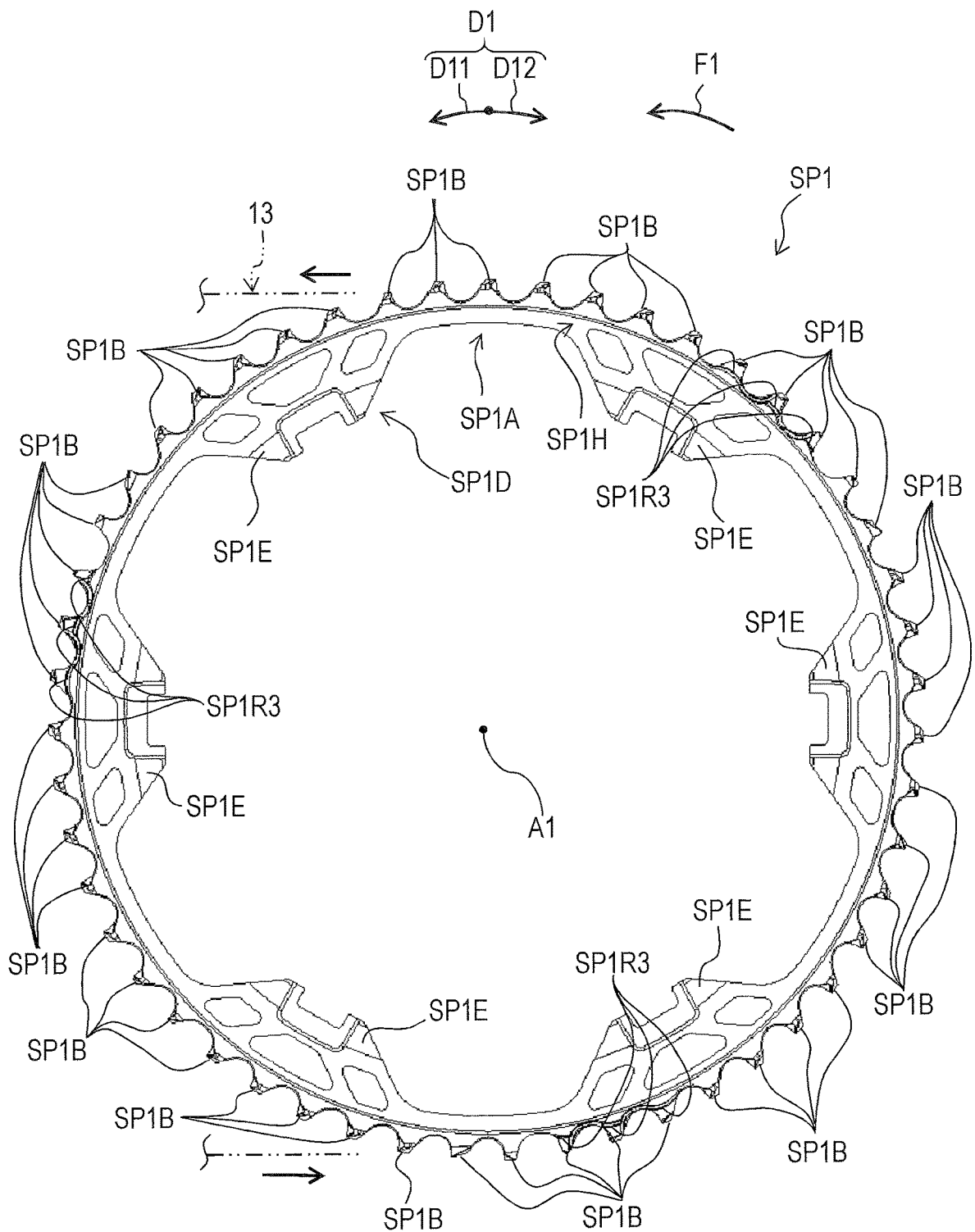
FIG. 10 is another side elevational view of the bicycle rear sprocket illustrated in FIG. 9.

As seen in FIG. 10, the bicycle rear sprocket SP1 further comprises an axially outward recess SP1R3 provided on the inward facing side SP1H to facilitate the outward shifting operation in which the bicycle chain 13 is shifted from the bicycle rear sprocket SP1 to the smaller sprocket SP12. In this embodiment, the bicycle rear sprocket SP1 comprises a plurality of axially outward recesses SP1R3 provided on the inward facing side SP1H to facilitate the inward shifting operation. However, a total number of the axially outward recesses SP1R3 is not limited to this embodiment.

Figure 11:
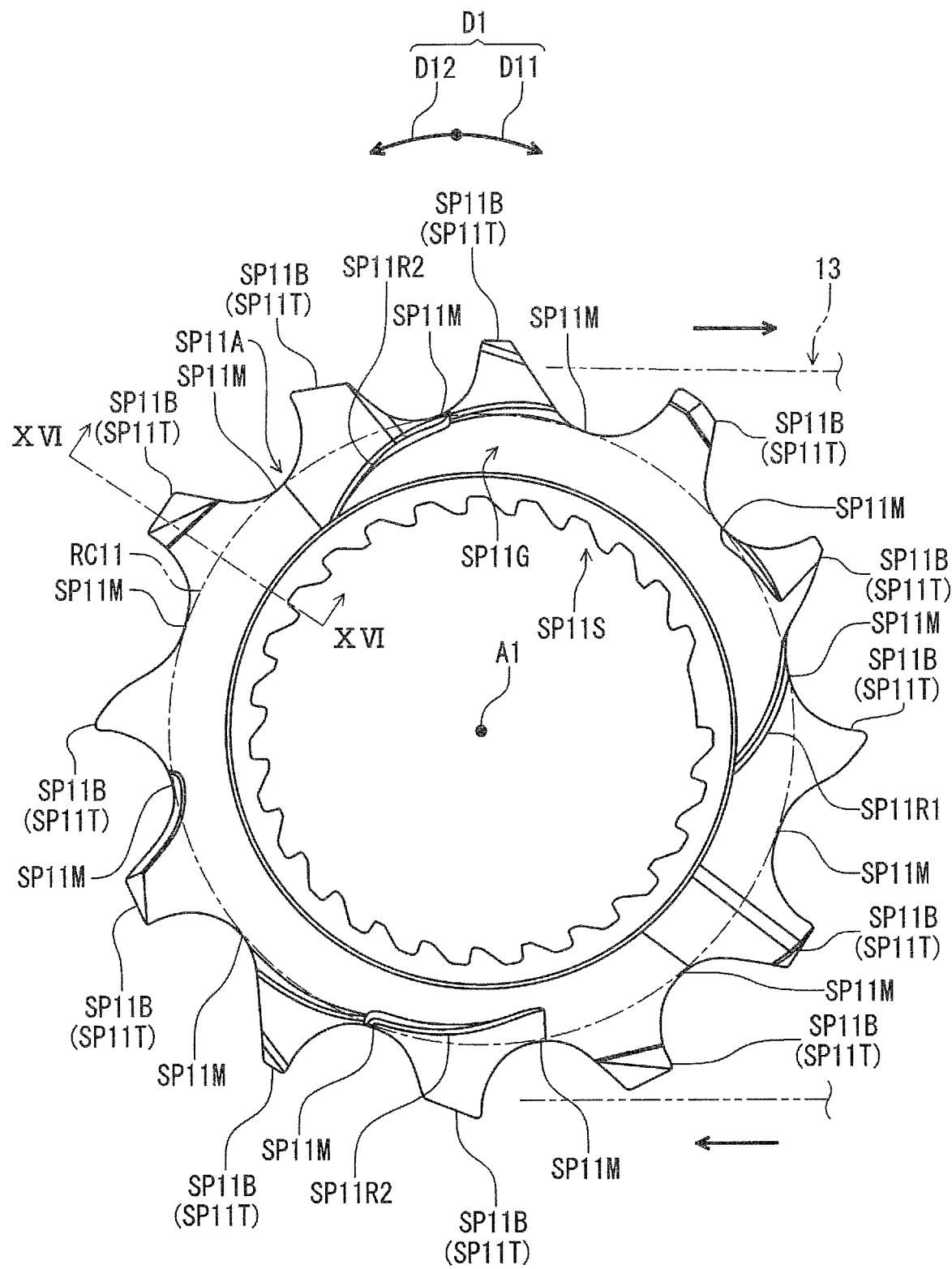
FIG. 11 is a side elevational view of a bicycle rear sprocket of the bicycle rear sprocket assembly illustrated in FIG. 2.

As seen in FIG. 11, the bicycle rear sprocket SP11 has the rotational center axis A1. The bicycle rear sprocket SP11 is configured to engage with the bicycle chain 13. The bicycle rear sprocket SP11 comprises a sprocket body SP11A and a plurality of sprocket teeth SP11B. The sprocket body SP11A is rotatable about the rotational center axis A1. The plurality of sprocket teeth SP11B extends radially outwardly from the sprocket body SP11A with respect to the rotational center axis A1 of the bicycle rear sprocket SP11. For example, the sprocket body SP11A has an annular shape. The hub engagement portion SP11S is provided on an inner periphery of the sprocket body SP11A.

The bicycle rear sprocket SP11 further comprises an axially inward recess SP11R1 provided on the outward facing side SP to facilitate an inward shifting operation in which the bicycle chain 13 is shifted from the smaller sprocket SP12 (FIG. 5) to the bicycle rear sprocket SP11. The bicycle rear sprocket SP11 further comprises an axially outward recess SP11R2 provided on the outward facing side SP11G to facilitate an outward shifting operation in which the bicycle chain 13 is shifted from the bicycle rear sprocket SP11 to the smaller sprocket SP12 (FIG. 5).

In this embodiment, the bicycle rear sprocket SP11 comprises a plurality of axially outward recesses SP11R2 provided on the outward facing side SP11G to facilitate the outward shifting operation. However, a total number of the axially outward recesses SP11R2 is not limited to this embodiment.

Figure 12:
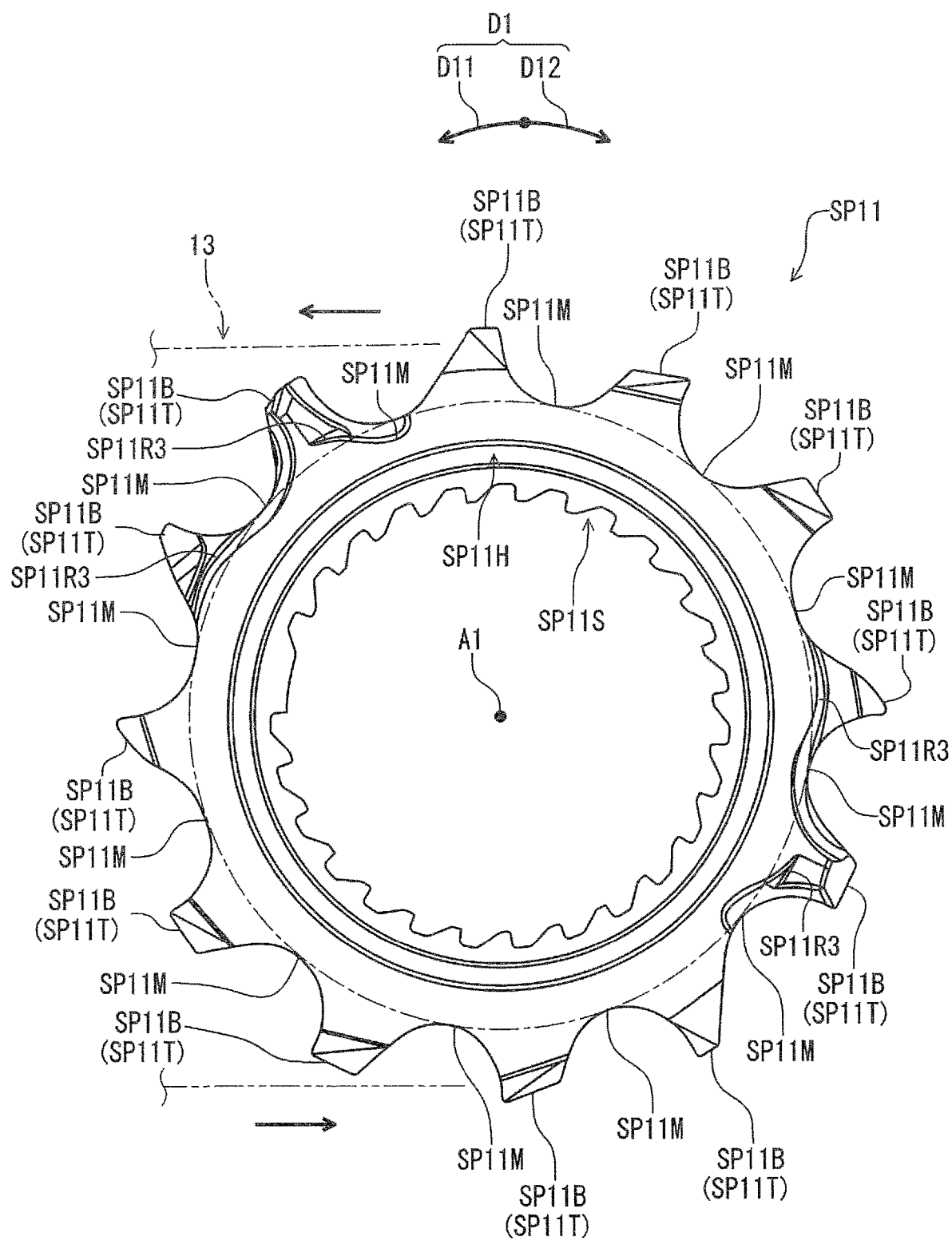
FIG. 12 is another side elevational view of the bicycle rear sprocket illustrated in FIG. 11.

As seen in FIG. 12, the bicycle rear sprocket SP11 further comprises an axially outward recess SP11R3 provided on the inward facing side SP11H to facilitate the outward shifting operation in which the bicycle chain 13 is shifted from the bicycle rear sprocket SP11 to the smaller sprocket SP12. In this embodiment, the bicycle rear sprocket SP11 comprises a plurality of axially outward recesses SP11R3 provided on the inward facing side SP11H to facilitate the inward shifting operation. However, a total number of the axially outward recesses SP11R3 is not limited to this embodiment.

Figure 13:
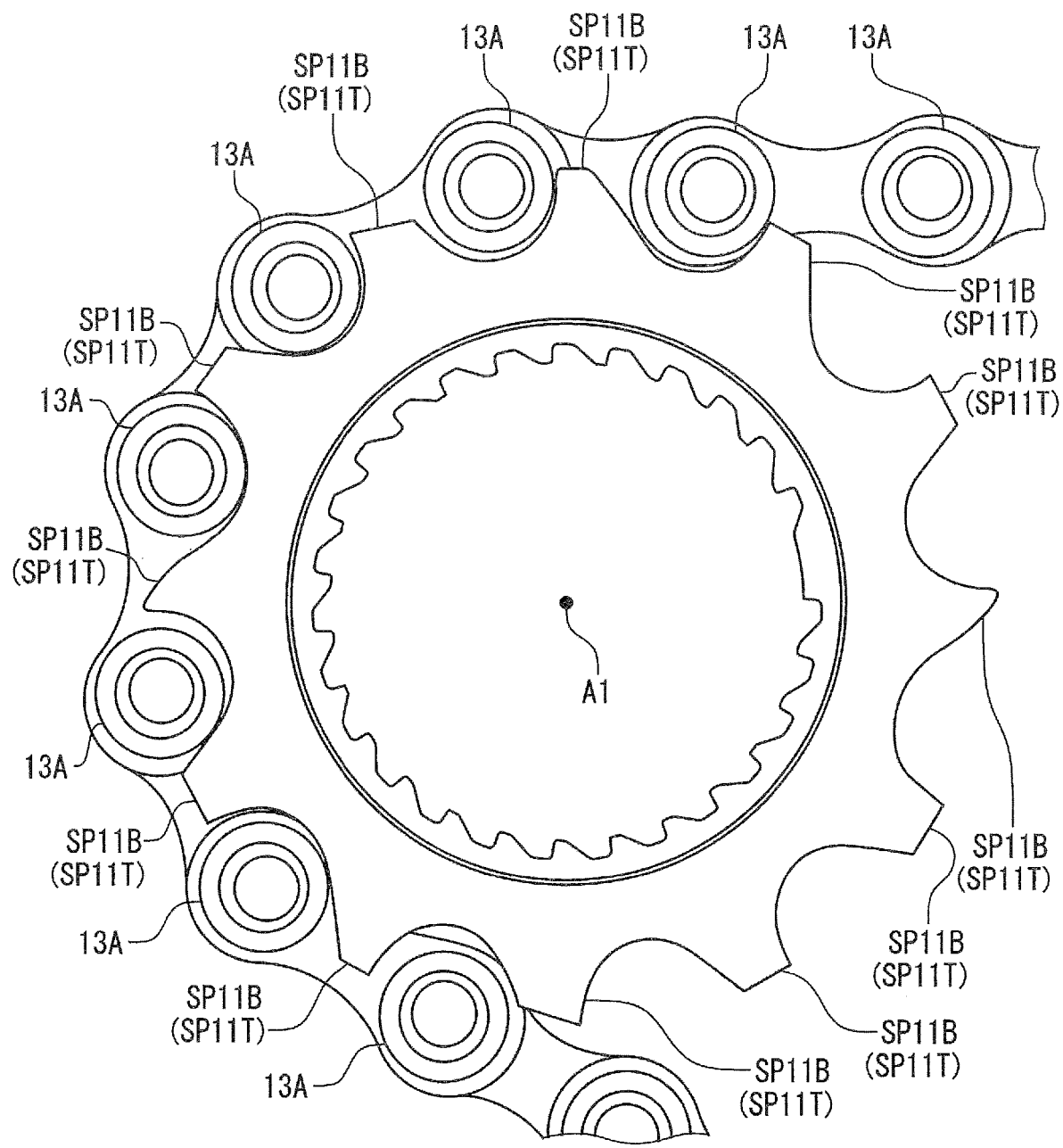
FIG. 13 is a side elevational view of a bicycle rear sprocket of the bicycle rear sprocket assembly illustrated in FIG. 11, with the chain

As seen in FIG. 13, the plurality of sprocket teeth SP11B includes at least one driving tooth SP11T configured to engage with a roller 13A of the bicycle chain 13. In this embodiment, the plurality of sprocket teeth SP11B includes plurality of driving teeth SP11T configured to engage with the roller 13A of the bicycle chain 13. However, a total number of the driving teeth SP11T is not limited to this embodiment.

Figure 14:
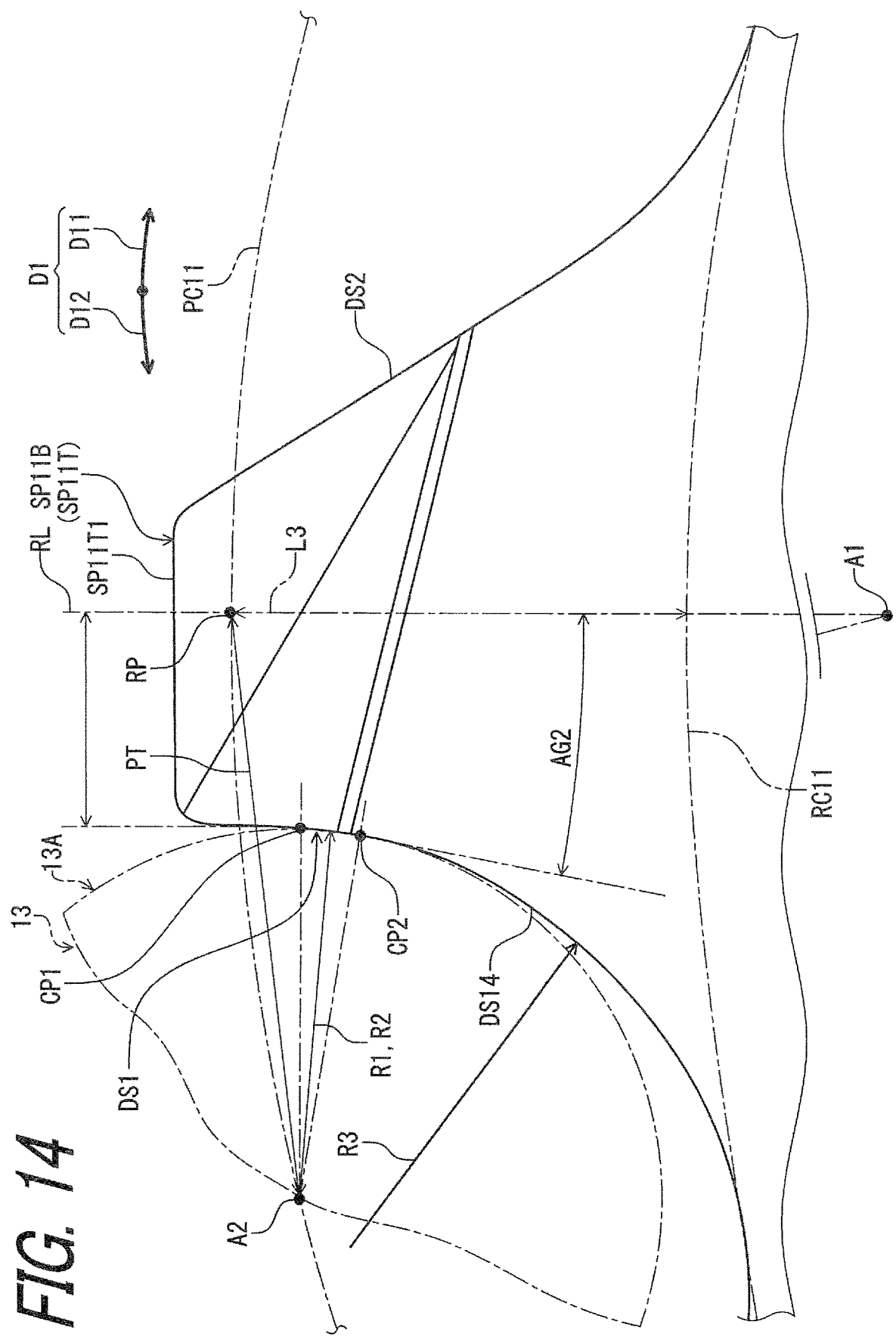
FIG. 14 is a partial enlarged side elevational view of the bicycle rear sprocket illustrated in FIG. 9, with a roller of the bicycle chain.

As seen in FIG. 14, the at least one driving tooth SP comprises a driving surface DS1. In this embodiment, each of the driving teeth SP11T comprises the driving surface DS1. The driving surface DS1 faces in the circumferential direction D1 to receive the driving rotational force F1 during pedaling. The driving surface DS1 is contactable with the roller 13A of the bicycle chain 13 during pedaling.

The driving tooth SP11T comprises a non-driving surface DS2 provided on a reverse side of the driving surface DS1 in the circumferential direction D1 with respect to the rotational center axis A1. The non-driving surface DS2 faces in the circumferential direction D1. The non-driving surface DS2 is provided on the reverse side of the driving surface DS1 to not receive the driving rotational force F1 from the bicycle chain 13 during pedaling.

Figure 15:
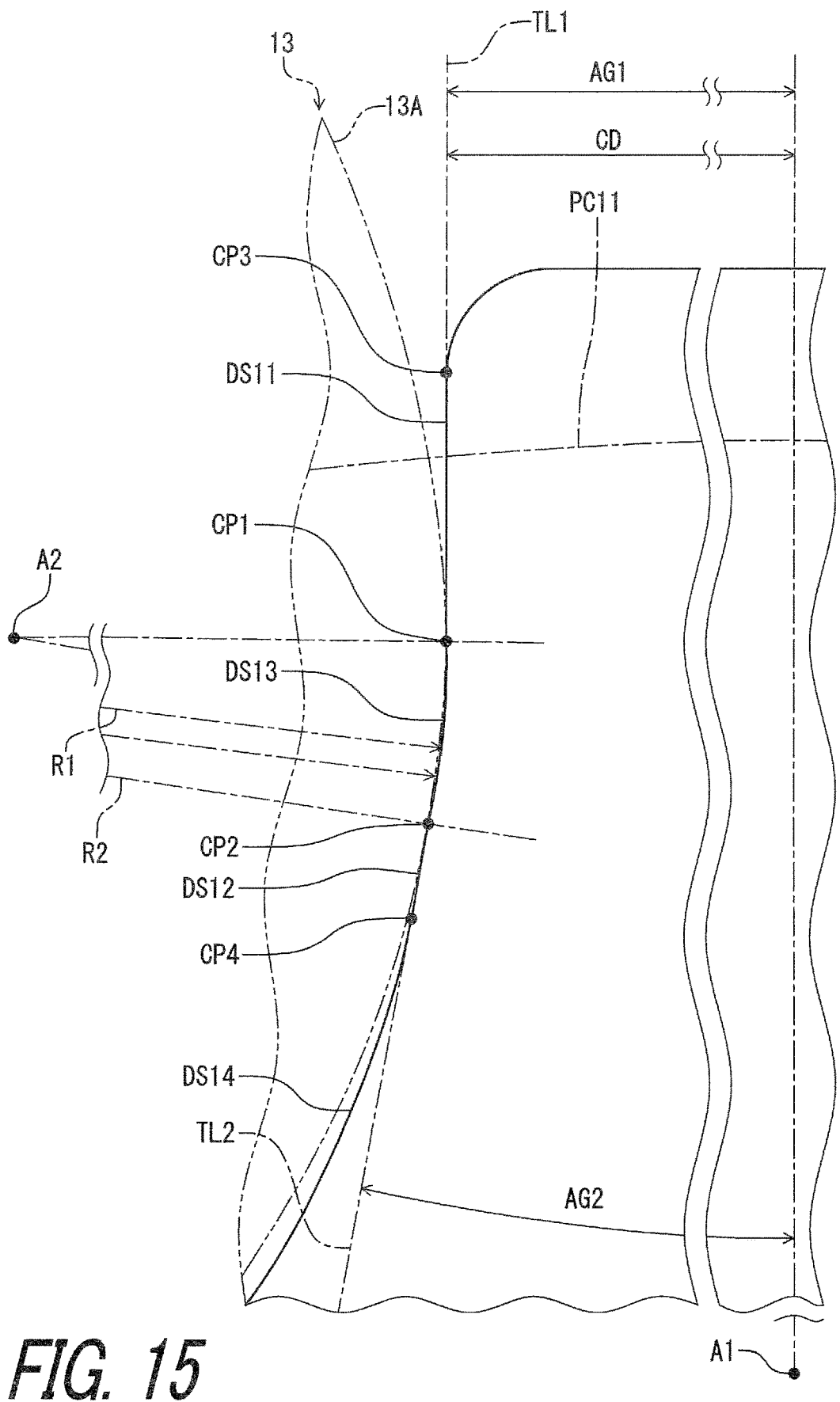
FIG. 15 is a partial enlarged side elevational view of the bicycle rear sprocket illustrated in FIG. 14, with the roller of the bicycle chain.

As seen in FIG. 15, the driving surface DS1 includes a first driving surface DS11 and a second driving surface DS12. The first driving surface DS11 is positioned radially outwardly of the second driving surface DS12 with respect to the rotational center axis A1. The first driving surface DS11 has a first contact point CP1 configured to contact the roller 13A of the bicycle chain 13 when the roller 13A is on the pitch circle PC11 of the bicycle rear sprocket SP11. The first driving surface DS11 extends radially outwardly from the first contact point CP1. The second driving surface DS12 has a second contact point CP2 configured to contact the roller 13A when the roller 13A is on the pitch circle PC11 of the bicycle rear sprocket SP11. The second driving surface DS12 extends radially inwardly from the second contact point CP2.

The first contact point CP1 is positioned radially outwardly of the second contact point CP2. The first contact point CP1 is spaced apart from the second contact point CP2. The first contact point CP1 is provided on the first driving surface DS11 to contact the roller 13A of the bicycle chain 13 when a roller center axis A2 of the roller 13A is on the pitch circle PC11 of the bicycle rear sprocket SP11. The second contact point CP2 is provided on the second driving surface DS12 to contact the roller 13A when the roller center axis A2 of the roller 13A is on the pitch circle PC11 of the bicycle rear sprocket SP11. Namely, the first contact point CP1 and the second contact point CP2 are in contact with the roller 13A when the roller center axis A2 of the roller 13A is on the pitch circle PC11 of the bicycle rear sprocket SP11.

As seen in FIG. 15, in this embodiment, the first driving surface DS11 has a straight shape when viewed along the rotational center axis A1. The first driving surface DS11 includes a first additional point CP3 provided radially outwardly of the first contact point CP1. The first driving surface DS11 extends straightly from the first contact point CP1 to the first additional point CP3. However, the first driving surface DS11 can have a curved shape instead of or in addition to the straight shape.

The second driving surface DS12 has a straight shape when viewed along the rotational center axis A1. The first driving surface DS11 includes a second additional point CP4 provided radially inwardly of the second contact point CP2. The second driving surface DS12 extends curved from the second contact point CP2 to the second additional point CP4. However, the second driving surface DS12 can have a straight shape instead of or in addition to the curved shape.

The at least one driving tooth SP11T comprises a first tangential line TL1 defined at the first contact point CP1 on the first driving surface DS11. In this embodiment, each of the driving teeth SP11T comprises the first tangential line TL1 defined at the first contact point CP1 on the first driving surface DS11. The first tangential line TL1 is a tangential line to the roller 13A at the first contact point CP1 in a state where the roller 13A is in contact with the first contact point CP1.

The at least one driving tooth SP11T comprises a first angle AG1 defined between the first tangential line TL1 and a reference line RL passing through the rotational center axis A1 and a reference point RP. As seen in FIG. 14, the reference point RP is offset from the roller center axis A2 of the roller 13A of the bicycle chain 13 toward a downstream side with respect to the driving rotational direction D11 of the bicycle rear sprocket SP11 by a half of a roller pitch PT of the bicycle chain 13 in a state where the roller 13A of the bicycle chain 13 simultaneously contacts the first contact point CP1 and the second contact point CP2. In this embodiment, each of the driving teeth SP11T comprises the first angle AG1 defined between the first tangential line TL1 and the reference line RL.

The at least one driving tooth SP11T comprises a second tangential line TL2 defined at the second contact point CP2 on the second driving surface DS12. In this embodiment, each of the driving tooth SP comprises the second tangential line TL2 defined at the second contact point CP2 on the second driving surface DS12. The second tangential line TL2 is a tangential line to the roller 13A at the second contact point CP2 in a state where the roller 13A is in contact with the second contact point CP2.

The at least one driving tooth SP11T comprises a second angle AG2 defined between the second tangential line TL2 and the reference line RL. The first angle AG1 is smaller than the second angle AG2. In this embodiment, each of the driving teeth SP11T comprises the second angle AG2 defined between the second tangential line TL2 and the reference line RL.

In this embodiment, the first angle AG1 is smaller than the second angle AG2. The first angle AG1 is equal to or smaller than 0 degree. In this embodiment, for example, the first angle AG1 is 0 degree, and the second angle AG2 is 10 degrees. However, the first angle AG1 is not limited to this embodiment and the above range.

For example, in a case where the first angle AG1 is 0 degree, the first tangential line TL1 is parallel to the reference line RL when viewed along the rotational center axis A1. In a case where the first angle AG1 is smaller than 0 degree, the first tangential line TL1 is inclined relative to the reference line RL to increase gradually a circumferential distance CD from the first contact point CP1 toward a radially outer side of the bicycle rear sprocket SP11 when viewed along the rotational center axis A1. In a case where the first angle AG1 is larger than 0 degree, the first tangential line TL1 is inclined relative to the reference line RL to decrease gradually the circumferential distance CD from the first contact point CP1 toward the radially outer side of the bicycle rear sprocket SP11 when viewed along the rotational center axis A1.

The driving surface DS1 includes an intermediate surface DS13 between the first contact point CP1 and the second contact point CP2. In this embodiment, the intermediate surface DS13 has a curved shape when viewed along the rotational center axis A1. However, the intermediate surface DS13 can at least partly include a flat surface.

As seen in FIG. 14, in this embodiment, a curvature of radius R1 of the intermediate surface DS13 ranges from 95% to 105% of a radius R2 of the roller 13A when viewed along the rotational center axis A1. The curvature of radius R1 of the intermediate surface DS13 ranges from 3.6 mm to 4 mm when viewed along the rotational center axis A1. As seen in FIG. 15, the curvature of radius R1 of the intermediate surface DS13 is equal to or smaller than the radius R2 of the roller 13A when viewed along the rotational center axis A1. In this embodiment, the curvature of radius R1 of the intermediate surface DS13 is smaller than the radius R2 of the roller 13A when viewed along the rotational center axis A1. Thus, a clearance is provided between the intermediate surface DS13 and the roller 13A when the first contact point CP1 and the second contact point CP2 contact the roller 13A. However, the curvature of radius R1 of the intermediate surface DS13 is not limited to this embodiment and the above ranges. The curvature of radius R1 of the intermediate surface DS13 can be equal to or larger than the radius R2 of the roller 13A when viewed along the rotational center axis A1.

The driving surface DS1 includes a radially inner surface DS14 provided radially inwardly of the second driving surface DS12. The radially inner surface DS14 has a curved shape when viewed along the rotational center axis A1. However, the radially inner surface DS14 can have a flat shape instead of or in addition to the curved shape.

In this embodiment, the radially inner surface DS14 has a curvature of radius R3 larger than the curvature of radius R1 of the intermediate surface DS13 when viewed along the rotational center axis. However, the curvature of radius R3 of the radially inner surface DS14 can be equal to or smaller than the curvature of radius R1 of the intermediate surface DS13 when viewed along the rotational center axis A1.

The at least one driving tooth SP11T is asymmetry with respect to the reference line RL. In this embodiment, each of the driving teeth SP11T is asymmetry with respect to the reference line RL. However, at least one of the driving teeth SP11T can be symmetry with respect to the reference line RL.

Figure 16:
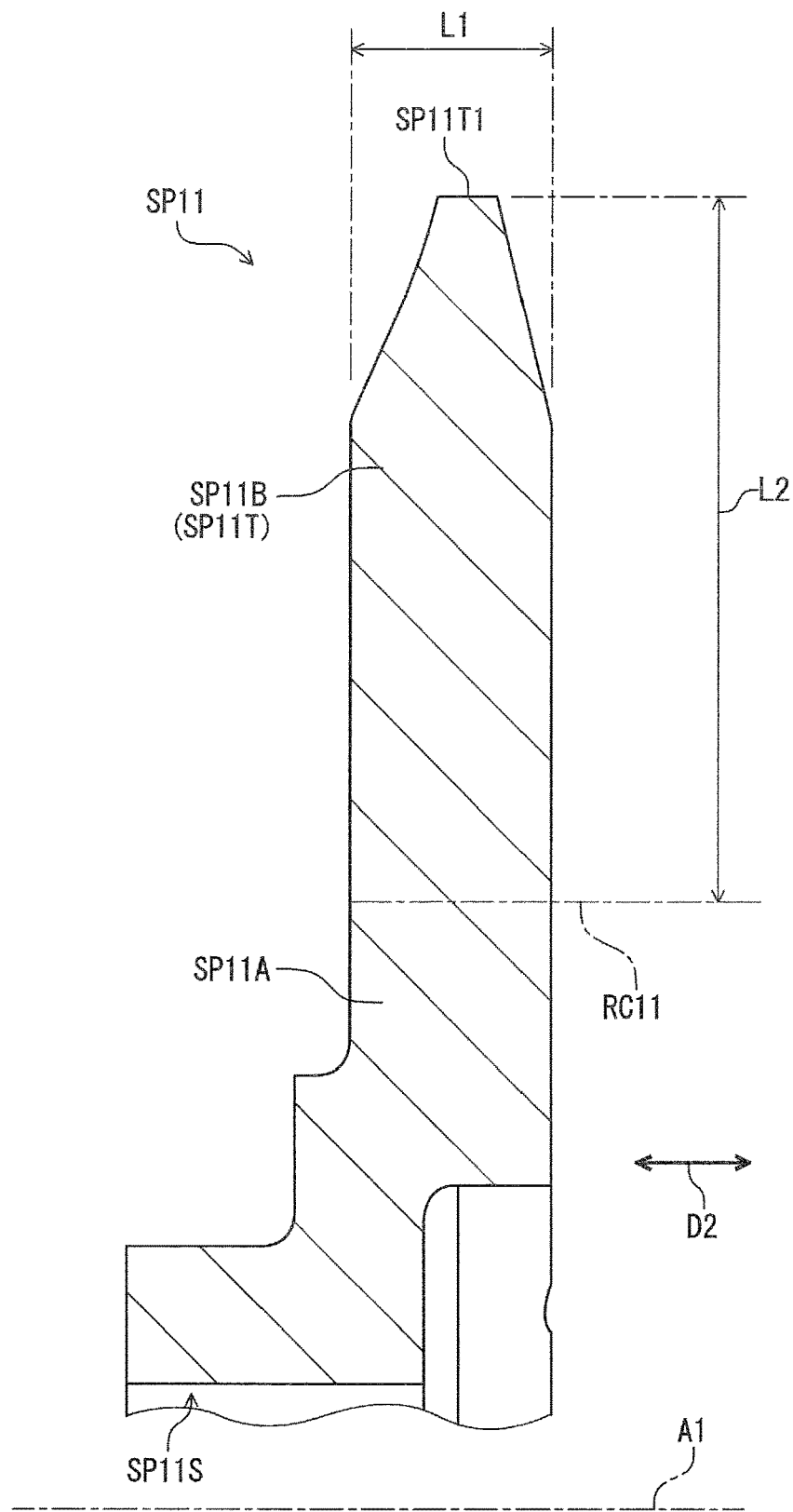
FIG. 16 is a cross-sectional view of the bicycle rear sprocket assembly taken along line XVI-XVI of FIG. 11.

As seen in FIG. 11, the plurality of sprocket teeth SP11B includes a plurality of tooth bottoms SP1M defining a root circle RC11. As seen in FIG. 16, the at least one driving tooth SP11T includes an axial maximum tooth-width L1 and a radial maximum tooth-height L2. The axial maximum tooth-width L1 is defined in the axial direction D2 of the rotational center axis A1 as a maximum width in the at least one driving tooth SP11T. The radial maximum tooth-height L2 is defined from the root circle RC11 to a radially outer end SP11T1 of the at least one driving tooth SP in a radial direction of the rotational center axis A1 as a maximum height in the at least one driving tooth SP11T. In this embodiment, the radial maximum tooth-height L2 is larger than the axial maximum tooth-width L1. However, the radial maximum tooth-height L2 can be equal to or smaller than the axial maximum tooth-width L1.

As seen in FIG. 14, a radial distance L3 defined from the root circle RC11 to the pitch circle PC11 of the bicycle rear sprocket SP11 is larger than 4.2 mm. In this embodiment, for example, the radial distance L3 is 4.4 mm. However, the radial distance L3 is not limited to this embodiment and the above range.

The bicycle rear sprockets SP2 to SP10 and SP12 have substantially the same structures as that of at least one of the bicycle rear sprockets SP1 and SP11. Thus, they will not be described in detail here for the sake of brevity.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rear sprocket comprising:
    a sprocket body; and
    a plurality of sprocket teeth extending radially outwardly from the sprocket body with respect to a rotational center axis of the bicycle rear sprocket, the plurality of sprocket teeth including at least one driving tooth configured to engage with a roller of a bicycle chain, the at least one driving tooth comprising:
        a driving surface including a first driving surface and a second driving surface, the first driving surface being positioned radially outwardly of the second driving surface with respect to the rotational center axis, the first driving surface having a first contact point configured to contact the roller of the bicycle chain when the roller is on a pitch circle of the bicycle rear sprocket, the second driving surface having a second contact point configured to contact the roller when the roller is on the pitch circle of the bicycle rear sprocket, the pitch circle has a radius that is defined as a distance from the rotational center axis to a roller center axis of the roller when the roller is in contact with the first contact point and the second contact point;
        a first tangential line defined at the first contact point on the first driving surface;
        a first angle defined between the first tangential line and a reference line passing through the rotational center axis and a reference point, the reference point being offset from a roller center axis of the roller of the bicycle chain toward a downstream side with respect to a driving rotational direction of the bicycle rear sprocket by a half of a roller pitch of the bicycle chain in a state where the roller of the bicycle chain simultaneously contacts the first contact point and the second contact point;
        a second tangential line defined at the second contact point on the second driving surface; and
        a second angle defined between the second tangential line and the reference line, the first angle being smaller than the second angle.

2. The bicycle rear sprocket according to claim 1, wherein
    the driving surface includes an intermediate surface between the first contact point and the second contact point, and
    the intermediate surface has a curved shape when viewed along the rotational center axis.

3. The bicycle rear sprocket according to claim 2, wherein a curvature of radius of the intermediate surface ranges from 95% to 105% of a radius of the roller when viewed along the rotational center axis.

4. The bicycle rear sprocket according to claim 2, wherein a curvature of radius of the intermediate surface ranges from 3.6 mm to 4 mm when viewed along the rotational center axis.

5. The bicycle rear sprocket according to claim 2, wherein a curvature of radius of the intermediate surface is equal to or smaller than a radius of the roller when viewed along the rotational center axis.

6. The bicycle rear sprocket according to claim 2, wherein
    the driving surface includes a radially inner surface provided radially inwardly of the second driving surface, and
    the radially inner surface has a curved shape when viewed along the rotational center axis.

7. The bicycle rear sprocket according to claim 6, wherein the radially inner surface has a curvature of radius larger than a curvature of radius of the intermediate surface when viewed along the rotational center axis.

8. The bicycle rear sprocket according to claim 1, wherein
    the first driving surface has a straight shape when viewed along the rotational center axis,
    the second driving surface has a straight shape when viewed along the rotational center axis, and
    the first driving surface and the second driving surface are not coplanar.

9. The bicycle rear sprocket according to claim 1, wherein the first angle is equal to or smaller than 0 degree.

10. The bicycle rear sprocket according to claim 1, wherein
    the first driving surface extends radially outwardly from the first contact point.

11. The bicycle rear sprocket according to claim 1, wherein
    the second driving surface extends radially inwardly from the second contact point.

12. The bicycle rear sprocket according to claim 1, wherein
    the at least one driving tooth is asymmetry with respect to the reference line.

13. The bicycle rear sprocket according to claim 1, further comprising:
    an outward facing side facing in an axial direction parallel to the rotational center axis;
    an inward facing side facing in the axial direction, the inward facing side being opposite to the outward facing side in the axial direction; and
    an axially inward recess provided on the outward facing side to facilitate an inward shifting operation in which the bicycle chain is shifted from a smaller sprocket to the bicycle rear sprocket.

14. The bicycle rear sprocket according to claim 1, further comprising:
    an outward facing side facing in an axial direction parallel to the rotational center axis;

an inward facing side facing in the axial direction, the inward facing side being opposite to the outward facing side in the axial direction; and an axially outward recess provided on the outward facing side to facilitate an outward shifting operation in which the bicycle chain is shifted from the bicycle rear sprocket to a smaller sprocket.

15. The bicycle rear sprocket according to claim 1, further comprising:

an outward facing side facing in an axial direction parallel to the rotational center axis;

an inward facing side facing in the axial direction, the inward facing side being opposite to the outward facing side in the axial direction; and an axially outward recess provided on the inward facing side to facilitate an outward shifting operation in which the bicycle chain is shifted from the bicycle rear sprocket to a smaller sprocket.

16. The bicycle rear sprocket according to claim 1, wherein the plurality of sprocket teeth includes a plurality of tooth bottoms defining a root circle, the at least one driving tooth includes an axial maximum tooth-width and a radial maximum tooth-height, the axial maximum tooth-width being defined in an axial direction of the rotational center axis as a maximum width in the at least one driving tooth, the radial maximum tooth-height being defined from the root circle to a radially outer end of the at least one driving tooth in a radial direction of the rotational center axis as a maximum height in the at least one driving tooth, the radial maximum tooth-height being larger than the axial maximum tooth-width.

17. The bicycle rear sprocket according to claim 1, wherein the plurality of sprocket teeth includes a plurality of tooth bottoms defining a root circle, and a radial distance defined from the root circle to the pitch circle of the bicycle rear sprocket is larger than 4.2 mm.

18. A bicycle rear sprocket assembly comprising:

the bicycle rear sprocket according to claim 1, the bicycle rear sprocket including a hub engagement portion configured to engage with the bicycle hub assembly.

19. The bicycle rear sprocket assembly according to claim 18, further comprising a sprocket support configured to engage with the bicycle hub assembly, the sprocket support including a sprocket attachment part, the bicycle rear sprocket being attached to the sprocket attachment part.

20. The bicycle rear sprocket assembly according to claim 19, wherein the sprocket support includes a hub engagement part configured to engage with the bicycle hub assembly.

* * * * *